(12) United States Patent
Suzuki et al.

(10) Patent No.: US 10,222,098 B2
(45) Date of Patent: Mar. 5, 2019

(54) REFRIGERATION CYCLE APPARATUS

(71) Applicant: Mitsubishi Electric Corporation, Tokyo (JP)

(72) Inventors: Yasuhiro Suzuki, Tokyo (JP); Takao Komai, Tokyo (JP); Akira Maeda, Tokyo (JP); Takaaki Takishita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 383 days.

(21) Appl. No.: 14/894,760

(22) PCT Filed: Jul. 30, 2014

(86) PCT No.: PCT/JP2014/070001
§ 371 (c)(1),
(2) Date: Nov. 30, 2015

(87) PCT Pub. No.: WO2015/037354
PCT Pub. Date: Mar. 19, 2015

(65) Prior Publication Data
US 2016/0109162 A1    Apr. 21, 2016

(30) Foreign Application Priority Data
Sep. 13, 2013   (JP) .................... 2013-190512

(51) Int. Cl.
  F25B 1/00       (2006.01)
  F25B 13/00      (2006.01)
  (Continued)

(52) U.S. Cl.
  CPC .............. *F25B 13/00* (2013.01); *F24F 1/32* (2013.01); *F24F 11/30* (2018.01); *F24F 13/20* (2013.01);
  (Continued)

(58) Field of Classification Search
  CPC . F24D 15/04; F24F 13/20; F24F 13/30; F24F 1/32; F24F 4/06; F24F 2001/0074; F25B 13/00; F25B 2313/003
  See application file for complete search history.

(56) References Cited

U.S. PATENT DOCUMENTS

2006/0006244 A1*  1/2006  Morrow ............. G05D 23/1902
                                                       236/1 C
2011/0185763 A1*  8/2011  Wakashima ............ F24F 1/06
                                                       62/434
2016/0109162 A1   4/2016  Suzuki et al.

FOREIGN PATENT DOCUMENTS

CN        204313385 U     5/2015
JP        50-17252 Y1     5/1975
              (Continued)

OTHER PUBLICATIONS

JP 2013064525A English translation JP 10047751A English translation.*

(Continued)

*Primary Examiner* — Ned Landrum
*Assistant Examiner* — Melodee Jefferson
(74) *Attorney, Agent, or Firm* — Posz Law Group, PLC

(57) ABSTRACT

The inside of a casing constituting an indoor unit of an air-conditioning apparatus is laterally divided by an air passage partition so that an air passage chamber housing an indoor fan and an indoor heat exchanger is defined close to a casing side panel. A space in the casing close to the casing side panel is further vertically divided by a partition having through holes so that a pipe connection chamber housing parts of the extension pipes, flare joints, and indoor pipes is defined in an upper portion and a pipe draw-out chamber in which the extension pipes are arranged is defined in a lower (Continued)

portion. Gaps between outer peripheries of the extension pipes and inner peripheries of the through holes are filled with insulations.

10 Claims, 13 Drawing Sheets

(51) Int. Cl.

| | | |
|---|---|---|
| *F24F 13/20* | (2006.01) | |
| *F24F 1/32* | (2011.01) | |
| *F24H 9/16* | (2006.01) | |
| *G01M 3/00* | (2006.01) | |
| *G01M 3/18* | (2006.01) | |
| *F24F 11/30* | (2018.01) | |
| *F25B 47/02* | (2006.01) | |
| *F24H 4/06* | (2006.01) | |
| *F24D 15/04* | (2006.01) | |
| *F24F 110/00* | (2018.01) | |
| *F24F 11/36* | (2018.01) | |

(52) U.S. Cl.
CPC ............ *F24H 9/165* (2013.01); *G01M 3/002* (2013.01); *G01M 3/18* (2013.01); *F24D 15/04* (2013.01); *F24F 11/36* (2018.01); *F24F 2110/00* (2018.01); *F24H 4/06* (2013.01); *F25B 47/025* (2013.01); *F25B 2313/003* (2013.01); *F25B 2313/006* (2013.01); *F25B 2400/121* (2013.01); *Y02B 30/12* (2013.01)

(56) References Cited

FOREIGN PATENT DOCUMENTS

| | | | | | |
|---|---|---|---|---|---|
| JP | 1-94834 | U | 6/1989 | | |
| JP | 4-4621 | U | 1/1992 | | |
| JP | 09-126490 | A | 5/1997 | | |
| JP | 09-170778 | A | 6/1997 | | |
| JP | 10-047751 | A | 2/1998 | | |
| JP | 10047751 | A | * 2/1998 | ................ | F24F 1/00 |
| JP | 2006-046705 | A | 2/2006 | | |
| JP | 2013064525 | A | * 4/2013 | ................ | F24F 1/00 |

OTHER PUBLICATIONS

Office Action dated Sep. 20, 2016 issued in corresponding CN patent application No. 201410437684.1 (and English translation).
Office Action dated Jul. 19, 2017 issued in corresponding CN patent application No. 201510276299.8 (and English translation).
Office Action dated Jan. 23, 2017 issued in corresponding CN patent application No. 201510276299.8 (and English translation).
Extended European Search Report dated Apr. 3, 2017 issued in corresponding EP patent application No. 14843274.3.
International Search Report of the International Searching Authority dated Nov. 4, 2014 for the corresponding International application No. PCT/JP2014/070001 (with English translation).

* cited by examiner

REFRIGERATION CYCLE APPARATUS

CROSS REFERENCE TO RELATED APPLICATION

This application is a U.S. national stage application of International Application No. PCT/ JP2014/070001 filed on Jul. 30, 2014, which claims priority to Japanese Patent Application No. 2013-190512 filed on Sep. 13, 2013, the disclosures of which are incorporated herein by reference.

TECHNICAL FIELD

The present invention relates to a refrigeration cycle apparatus, particularly to a refrigeration cycle apparatus that performs a refrigeration cycle using refrigerant having a low global warming potential.

BACKGROUND ART

A "HFC refrigerant" such as nonflammable R410A has been conventionally used as refrigerant for a refrigeration cycle performed by an air-conditioning apparatus, which is one of refrigeration cycle apparatuses. Unlike a conventional "HCFC refrigerant" such as R22, this R410A has an ozone-depletion potential (hereinafter referred to as an "ODP") of 0 (zero) and does not deplete an ozone layer, but has a high global warming potential (hereinafter referred to as a "GWP").

Thus, as a part of prevention of global warming, it has been investigated to shift from a high-GWP HFC refrigerant such as R410A to a low-GWP refrigerant.

Candidates of such a low-GWP refrigerant include an HC refrigerant such as R290 ($C_3H_8$: propane) and R1270 ($C_3H_6$: propylene), which are natural refrigerants. Unlike a nonflammable R410A, the candidate refrigerants are extremely flammable, and thus, a caution is needed against refrigerant leakage.

Candidates of such a low-GWP refrigerant also include R32 ($CH_2F_2$: difluoromethane) having a GWP lower than that of R410A, as an HFC refrigerant having no double bonds of carbon in its composition.

Candidates of similar refrigerants include halogenated hydrocarbon, which is a type of an HFC refrigerant similar to R32 and has double bonds of carbon in its composition. Examples of halogenated hydrocarbon include HFO-1234yf ($CF_3CF=CH_2$: tetrafluoropropene) and HFO-1234ze ($CF_3$—CH=CHF). To distinguish from an HFC refrigerant such as R32 having no double bonds of carbon in its composition, an HFC refrigerant having double bonds of carbon is often referred to as "HFO" using "O" that stands for olefin (unsaturated hydrocarbon having double bonds of carbon is called olefin).

Such a low-GWP HFC refrigerant (including an HFO refrigerant) is not as highly flammable as an HC refrigerant exemplified by R290 ($C_3H_8$: propane), which is a natural refrigerant, but unlike nonflammable R410A, has a flammability at a slightly flammable level. Thus, similarly to R290, a caution is needed against refrigerant leakage. Refrigerant having flammability, including refrigerants at a slightly flammable level, will be hereinafter referred to as "flammable refrigerant."

In a case where flammable refrigerant leaks into an indoor living space (hereinafter referred to as a room or indoor), a refrigerant concentration in the room increases and may reach a flammable concentration. Specifically, in a slow leakage which may result from leakage refrigerant through a pinhole in a weld zone of pipes of a heat exchanger mounted in an indoor unit or from a joint portion of an extension pipe connecting the indoor unit to an outdoor unit, a flow rate of leakage is small and a flammable concentration is not reached. On the other hand, in a fast leakage which may result from a break of the extension pipe due to an external force or the of detachment of the joint to the extension pipe, a flow rate of leakage is high and a flammable concentration may be reached.

In view of this, to prevent refrigerant leakage from an indoor unit into a room, a split-type air-conditioning apparatus (see, for example, Patent Literature 1) is disclosed as follows. In this apparatus, the indoor unit is connected to an extension pipe by welding (hereinafter referred to as an "extension pipe weld zone") without using a joint and a weld zone (hereinafter referred to as a "heat exchanger pipe weld zone") between the extension pipe weld zone and a pipe of a heat exchanger is housed in a sealed casing. This configuration is intended to keep leaked refrigerant in the sealed casing even when refrigerant leaks in the extension pipe weld zone or the heat exchanger pipe weld zone.

CITATION LIST

Patent Literature

Patent Literature 1: Japanese Unexamined Patent Application Publication No. 10-47751 (page 6, FIG. 5)

SUMMARY OF INVENTION

Technical Problem

The split-type air-conditioning apparatus disclosed in Patent Literature 1, however, has the following problems:

(a) Since the indoor unit and the extension pipe are connected not by a joint but by welding, additional jobs such as preparation of a welding machine, not a general tool such as a spanner, and masking of peripheral portions for preventing spread of a fire are needed in on-site installation work, and consequently, an efficiency of on-site construction decreases.

(b) Furthermore, since a portion (hereinafter referred to as a hole) through which the extension pipe is drawn out from a sealed casing in the indoor unit needs to be hermetically sealed, a high degree of dimensional accuracy is required. Thus, in onsite installation, a high accuracy is required for processing dimensions in arrangement (e.g., bending and length adjustment) of extension pipes, and consequently, an efficiency of on-site construction decreases.

(c) A low accuracy in processing dimensions in the arrangement of extension pipes leads to insufficient sealing and, in the worst case, a failure in passing the extension pipe through the hole. Consequently, the extension pipes themselves need to be rearranged in some cases.

That is, to obtain sufficient sealing in the hole of the sealed casing, formation of the hole itself with high dimensional accuracy can be achieved by a supplier (manufacturer) of an air-conditioning apparatus, but on the other hand, a job of arranging extension pipes with high accuracy corresponding to high dimensional accuracy of the hole itself is not necessarily easy for an on-site installation technician, and the efficiency of construction decreases.

The present invention has been made to solve problems as described above, and an object thereof is to provide a refrigeration cycle apparatus that does not require high accuracy in processing dimensions in arranging extension pipes for on-site installation, when refrigerant leaks, can reduce the speed of refrigerant leakage, and can enhance the efficiency in on-site installation.

Solution to Problem

A refrigeration cycle apparatus according to the present invention uses a flammable refrigerant and includes an outdoor unit including at least a compressor and an outdoor pipe, an indoor unit including at least an indoor heat exchanger and an indoor pipe, an extension pipe connecting the outdoor pipe and the indoor pipe to each other, a pipe connection chamber disposed in a casing constituting the indoor unit and housing a connection portion connecting the indoor pipe and the extension pipe, and a pipe draw-out chamber disposed in the casing constituting the indoor unit. The extension pipe drawn out from the pipe connection chamber passes through the pipe draw-out chamber. The pipe connection chamber and the pipe draw-out chamber are partitioned from each other by a partition having a through hole, and the extension pipe penetrates the through hole. A part of the pipe draw-out chamber is constituted by a part of the casing constituting the indoor unit, and the extension pipe penetrates a through hole formed in the part of the casing.

Advantageous Effects of Invention

According to the present invention, the pipe connection chamber houses the connection portions connecting the indoor pipe and the extension pipe, and the extension pipe is drawn into the pipe draw-out chamber from the pipe connection chamber through the through hole in the partition, and also drawn into the outside (a room) of the indoor unit from the pipe draw-out chamber through the through hole in the casing. Thus, in a case where refrigerant leaks, the leaked refrigerant remains in the pipe connection chamber. Even when the leaked refrigerant flows into the pipe draw-out chamber through a gap formed in the through hole in the partition, the refrigerant that has flowed into the pipe draw-out chamber remains in the pipe draw-out chamber, and then flows into the room through the gap in the through hole in the casing.

At this time, the pipe connection chamber and the pipe draw-out chamber function as muffler containers, thereby reducing the leakage speed of refrigerant into the room. Then, since the amount of refrigerant diffused by an airflow in the room is larger than the amount of refrigerant flowing into the room, a region (space) having a high refrigerant concentration, especially a region having a concentration exceeding a flammable concentration, is not easily formed in the room. In addition, through holes formed in the part of the partition constituting the pipe draw-out chamber and in the part of the casing can be set at a size sufficient for obtaining an efficiency of on-site construction. Thus, arrangement (e.g., bending and length adjustment) of the extension pipe does not need a high processing accuracy. Thus, the on-site construction can be easily and promptly performed.

DESCRIPTION OF EMBODIMENTS

[Embodiment 1]

Figure 1:
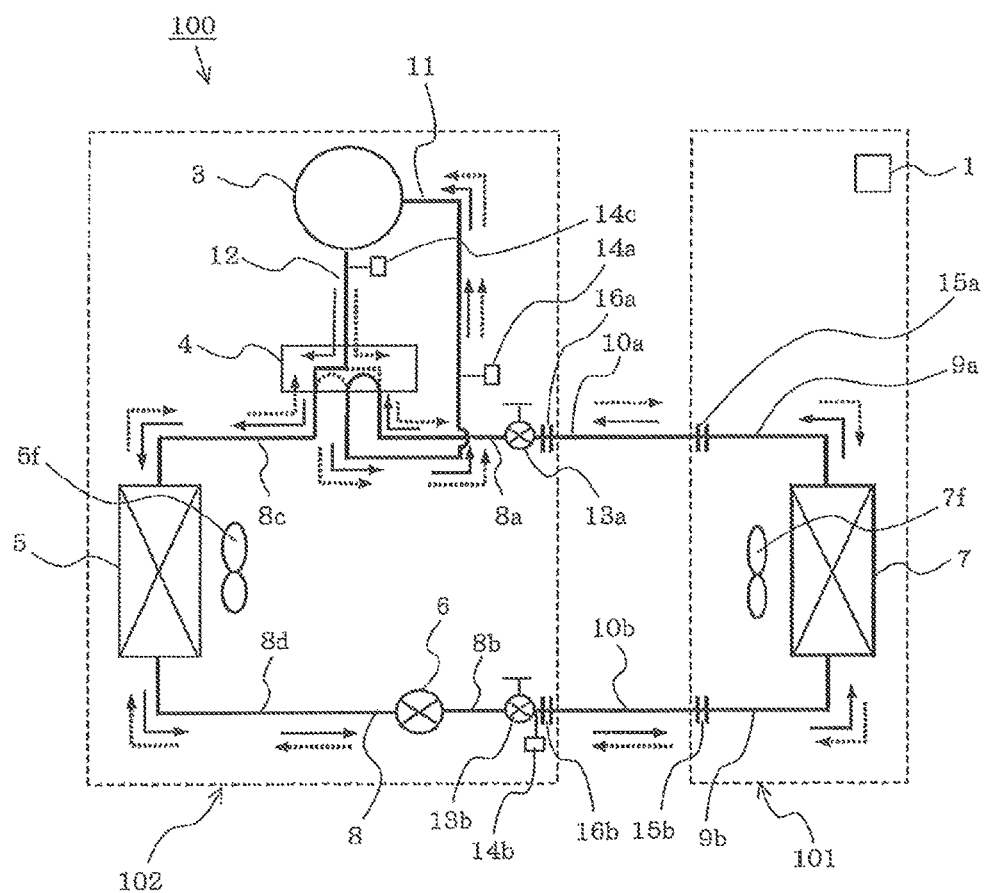
FIG. 1 is a circuit diagram illustrating a configuration of a refrigerant circuit of a refrigeration cycle apparatus according to Embodiment 1 of the present invention.

FIG. 1 is a circuit diagram illustrating a configuration of a refrigerant circuit of a refrigeration cycle apparatus according to Embodiment 1 of the present invention. In this embodiment, the air-conditioning apparatus as an example of a refrigeration cycle apparatus is described. However, the present invention is not limited to the air-conditioning apparatus, and is applicable to various types of equipment for performing a refrigeration cycle, such as a hot water supply system (see Embodiment 5).

(Air-Conditioning Apparatus)

In FIG. 1, an air-conditioning apparatus 100 is of a separate type including an indoor unit (i.e., a load side unit) 101 placed in a room, an outdoor unit (i.e., a heat source side unit) 102 placed outdoors (not shown), and pipes (hereinafter referred to as "extension pipes") 10a and 10b coupling the indoor unit 101 and the outdoor unit 102 together.

(Refrigerant Circuit of Outdoor Unit)

The outdoor unit 102 includes a compressor 3 that compresses and discharges refrigerant, a refrigerant channel switching valve (hereinafter referred to as a "four-way valve") 4 that changes the flow direction of refrigerant in the refrigerant circuit between a cooling operation and a heating operation, an outdoor heat exchanger 5 that is a heat source side heat exchanger for exchanging heat between outdoor air and refrigerant, and a pressure reducing device (hereinafter referred to as an expansion valve) 6 whose opening degree is changeable and which is an expansion unit such as an electronically controlled expansion valve for reducing the pressure of high-pressure refrigerant to low pressure. These components are connected to one another by outdoor pipes (i.e., heat source side refrigerant pipes) 8.

An outdoor fan 5f for supplying (blowing) outdoor air to the outdoor heat exchanger 5 faces the outdoor heat exchanger 5. An airflow passing through the outdoor heat exchanger 5 is generated by rotating the outdoor fan 5f. In the outdoor unit 102, a propeller fan is used as the outdoor fan 5f and is disposed downstream of the outdoor heat exchanger 5 (downstream of the airflow generated by the outdoor fan 5f) to suck outdoor air through the outdoor heat exchanger 5.

(Outdoor Pipe)

The outdoor pipes 8 include a refrigerant pipe 8a connecting an extension pipe connecting valve 13a at a gas side (in a cooling operation) to the four-way valve 4, a refrigerant pipe 8c connecting a suction pipe 11, a discharge pipe 12, and the four-way valve 4 to the outdoor heat exchanger 5, a refrigerant pipe 8d connecting the outdoor heat exchanger 5 to the expansion valve 6, and a refrigerant pipe 8b connecting the expansion valve 6 to an extension pipe connecting valve 13b at a liquid side (in a cooling operation). These pipes 8a to 8d will be collectively referred to as the outdoor pipes 8.

(Extension Pipe Connecting Valve)

The gas-side extension pipe connecting valve 13a is disposed in a portion of the outdoor pipes 8 connected to the gas-side extension pipe 10a, whereas the liquid-side extension pipe connecting valve 13b is disposed in a portion of the outdoor pipes 8 connected to the liquid-side extension pipe 10b.

The gas-side extension pipe connecting valve 13a is a two-way valve that is switchable between open and dose, and a flare joint 16a is attached to an end of the extension pipe connecting valve 13a.

The liquid-side extension pipe connecting valve 13b is a three-way valve that is switchable between open and dose, and a service port 14b for use in evacuation (in preparation for supplying refrigerant to the air-conditioning apparatus 100) and a flare joint 16b are attached to the extension pipe connecting valve 13b.

External threads are formed on portions of the flare joints 16a and 16b attached to the extension pipe connecting valves 13a and 13b (including the service port 14b) at the side of the outdoor pipes 8. Flare nuts (not shown) provided with internal threads to be engaged with the external threads are attached in shipment (including shipment of the air-conditioning apparatus 100) of the outdoor unit 102.

(Service Port)

For convenience of description, a portion of the outdoor pipes 8 located in a discharge side of the compressor 3 and connecting from the compressor 3 to an inlet of the four-way valve 4 will be referred to as a discharge pipe 12, and a portion of the outdoor pipes 8 located in a suction side of the compressor 3 and connecting from the four-way valve 4 to the compressor 3 will be hereinafter referred to as a suction pipe 11.

Then, in any of a cooling operation (an operation in which low-temperature low-pressure refrigerant is supplied to an indoor heat exchanger 7) or a heating operation (an operation in which high-temperature high-pressure refrigerant is supplied to the indoor heat exchanger 7), high-temperature high-pressure gas refrigerant compressed in the compressor 3 always flows in the discharge pipe 12, and low-temperature low-pressure refrigerant subjected to evaporation flows in the suction pipe 11.

In the present invention, the levels of temperature and pressure, such as "low temperature," "intermediate temperature," "high temperature," "low pressure," and "high pressure," are not determined based on specific absolute values, and indicate relative relationships in the state of, for example, a system or an apparatus, for convenience of description.

Low-temperature low-pressure refrigerant flowing in the suction pipe 11 can be gas refrigerant or in a two-phase state. The suction pipe 11 includes a service port 14a provided with a flare joint at a low-pressure side, and the discharge pipe 12 includes a service port 14c provided with a flare joint at a high-pressure side. These pipes 11 and 12 are used to connect a pressure gauge in installation or test run for repair to measure an operating pressure.

External threads are formed on flare joints (not shown) of the service ports 14a and 14c, and flare nuts (not shown) are attached to the external threads in shipment (including shipment of the air-conditioning apparatus 100) of the outdoor unit 102.

(Refrigerant Circuit of Indoor Unit)

The indoor unit 101 includes the indoor heat exchanger 7 that is a use side heat exchanger for exchanging heat between indoor air and refrigerant. The indoor heat exchanger 7 is connected to indoor pipes (i.e., use side refrigerant pipes) 9a and 9b.

A flare joint 15a is provided in a portion of the indoor pipe 9a connected to the gas-side extension pipe 10a to connect the gas-side extension pipe 10a thereto, whereas a flare joint 15b is provided in a portion of the indoor pipe 9b connected to the liquid-side extension pipe 10b to connect the liquid-side extension pipe 10b thereto.

External threads are formed on the flare joints 15a and 15b, and flare nuts (not shown) provided with internal threads to be engaged with the external threads are attached in shipment (including shipment of the air-conditioning apparatus 100) of the indoor unit 101.

Thus, the use of the mechanical joint for connecting the extension pipes 10a and 10b to the indoor unit 101 enables on-site construction to be performed with a general tool such as a spanner without preparing a welding machine.

In addition, an indoor fan 7f faces the indoor heat exchanger 7, and an airflow is generated by rotating the indoor fan 7f to pass through the indoor heat exchanger 7.

The indoor fan 7f may be of various types such as a cross-flow fan or a turbo fan, depending on the configuration of the indoor unit 101. The indoor fan 7f may be disposed downstream or upstream of the indoor heat exchanger 7 in the airflow generated by the indoor fan 7f.

(Refrigerant Circuit of Air-conditioning Apparatus)

Both ends of the gas-side extension pipe 10a are detachably connected to the flare joint 16a attached to the gas-side extension pipe connecting valve 13a of the outdoor unit 102 and the flare joint 15a attached to the indoor pipe 9a of the indoor unit 101. Both ends of the liquid-side extension pipe 10b are detachably connected to the flare joint 16b attached to the liquid-side extension pipe connecting valve 13b of the outdoor unit 102 and the flare joint 15b attached to the indoor pipe 9b of the indoor unit 101.

That is, the outdoor pipes 8 and the indoor pipes 9a and 9b are connected by the extension pipes 10a and 10b, thereby forming a refrigerant circuit that constitutes a compression heat pump cycle in which refrigerant compressed by the compressor 3 circulates.

(Refrigerant Flow in Cooling Operation)

In FIG. 1, solid arrows represent the flow direction of refrigerant in a cooling operation. In the cooling operation, the four-way valve 4 is switched to a refrigerant circuit as indicated by solid lines so that high-temperature high-pressure gas refrigerant discharged from the compressor 3 first flows into the outdoor heat exchanger 5 through the four-way valve 4.

The outdoor heat exchanger 5 serves as a condenser. That is, while an airflow generated by rotating the outdoor fan 5f is passing through the outdoor heat exchanger 5, outdoor air passing through the outdoor heat exchanger 5 and refrigerant flowing in the outdoor heat exchanger 5 exchange heat so that heat of condensation of the refrigerant is given to the outdoor air. In this manner, refrigerant is condensed in the outdoor heat exchanger 5 and becomes high-pressure intermediate-temperature liquid refrigerant.

Next, the high-pressure intermediate-temperature liquid refrigerant flows into the expansion valve 6 and adiabatically expands in the expansion valve 6 to be low-pressure low-temperature two-phase refrigerant.

Thereafter, the low-pressure low-temperature two-phase refrigerant is supplied to the indoor unit 101 by way of the liquid-side extension pipe 10b and flows into the indoor heat exchanger 7. The indoor heat exchanger 7 serves as an evaporator. Specifically, while a flow of indoor air generated by rotating the indoor fan 7f is passing through the indoor heat exchanger 7, the indoor air passing through the indoor heat exchanger 7 and refrigerant flowing in the indoor heat exchanger 7 exchange heat so that the refrigerant takes heat of vaporization (heating energy) from the indoor air and evaporates to be in the state of low-temperature low-pressure gas refrigerant or two-phase refrigerant. On the other hand, the indoor air passing through the indoor heat exchanger 7 takes cooling energy from the refrigerant to be cooled, thereby cooling the room.

Further, the refrigerant that has evaporated in the indoor heat exchanger 7 and become the low-temperature low-pressure gas refrigerant or the two-phase refrigerant is supplied to the outdoor unit 102 by way of the gas-side extension pipe 10a and is sucked into the compressor 3 through the four-way valve 4. This refrigerant is compressed in the compressor 3 to be high-temperature high-pressure gas refrigerant again. This cycle is repeated in the cooling operation.

(Refrigerant Flow in Heating Operation)

In FIG. 1, dotted arrows represent the flow direction of refrigerant in a heating operation. When the four-way valve 4 is switched to a refrigerant circuit as indicated by dotted lines, refrigerant flows in the direction opposite to that in the cooling operation and first flows into the indoor heat exchanger 7. The indoor heat exchanger 7 serves as a condenser and the outdoor heat exchanger 5 serves as an evaporator so that heat of condensation (heating energy) is given to indoor air passing through the indoor heat exchanger 7 and heats the indoor air. In this manner, a heating operation is performed.

(Refrigerant)

In the air-conditioning apparatus 100, refrigerant flowing in the refrigerant circuit is R32 ($CH_2F_2$: difluoromethane), which is a slightly flammable HFC refrigerant, having a GWP smaller than an HFC refrigerant R410A currently widely used in air-conditioning apparatuses and having a relatively small influence on global warming. In shipment, a certain amount of refrigerant is sealed in the outdoor unit 102 in advance. In installation of the air-conditioning apparatus 100, when shortage occurs because of the lengths of the extension pipes 10a and 10b, refrigerant is additionally supplied in an on-site job.

The refrigerant is not limited to R32 described above, and may be the above-described HFO refrigerant that is slightly flammable similarly to R32 is of a type of an HFC refrigerant, is halogenated hydrocarbon having double bonds of carbon in its composition, and is, for example, HFO-1234yf ($CF_3CF=CH_2$: tetrafluoropropene) or HFO-1234ze ($CF_3-CH=CHF$) having a GWP smaller than that of R32 refrigerant.

The refrigerant may be an HC refrigerant such as highly flammable R290 ($C_3H_8$: propane) or R1270 ($C_3H_6$: propylene). The refrigerant may be a mixed refrigerant as a mixture of two or more types of these refrigerants.

(Configuration of Indoor Unit)

Figure 2:
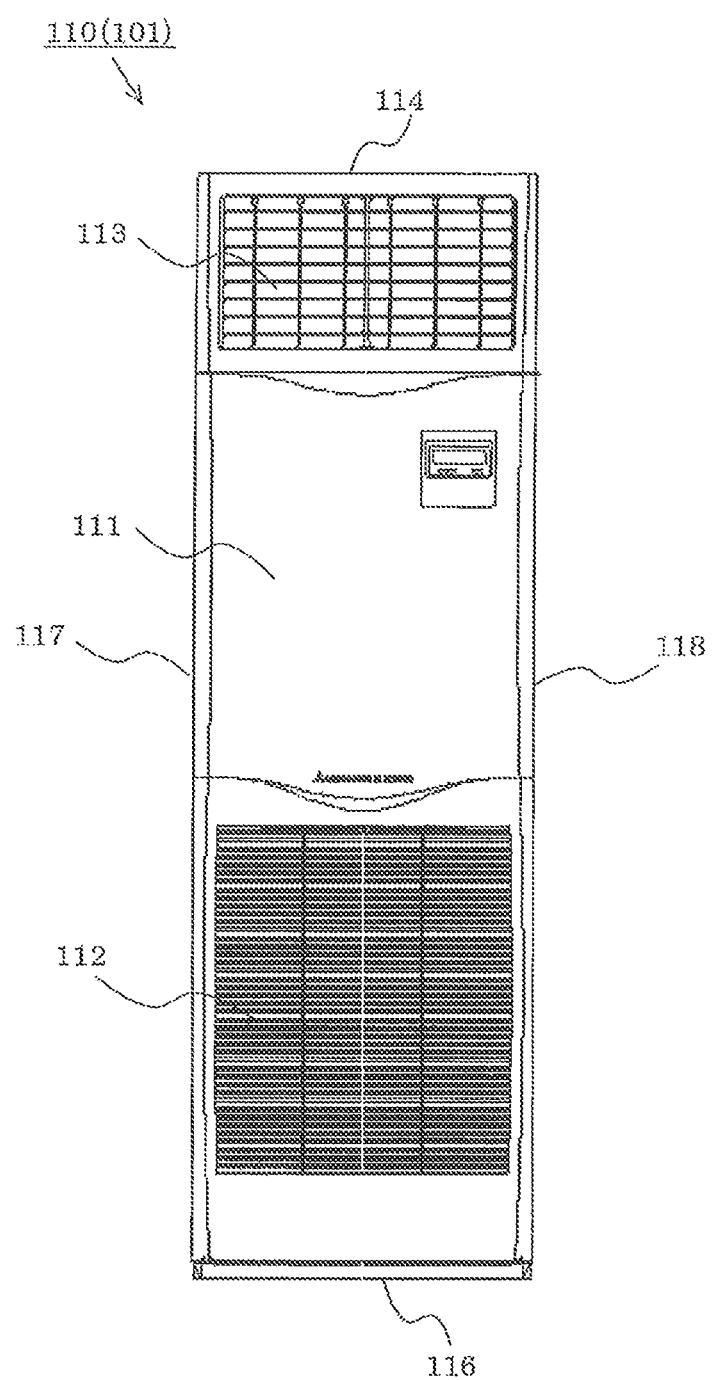
FIG. 2 is a front view illustrating an appearance of an indoor unit of an air-conditioning apparatus for describing the refrigeration cycle apparatus illustrated in FIG. 1.
Figure 3A:
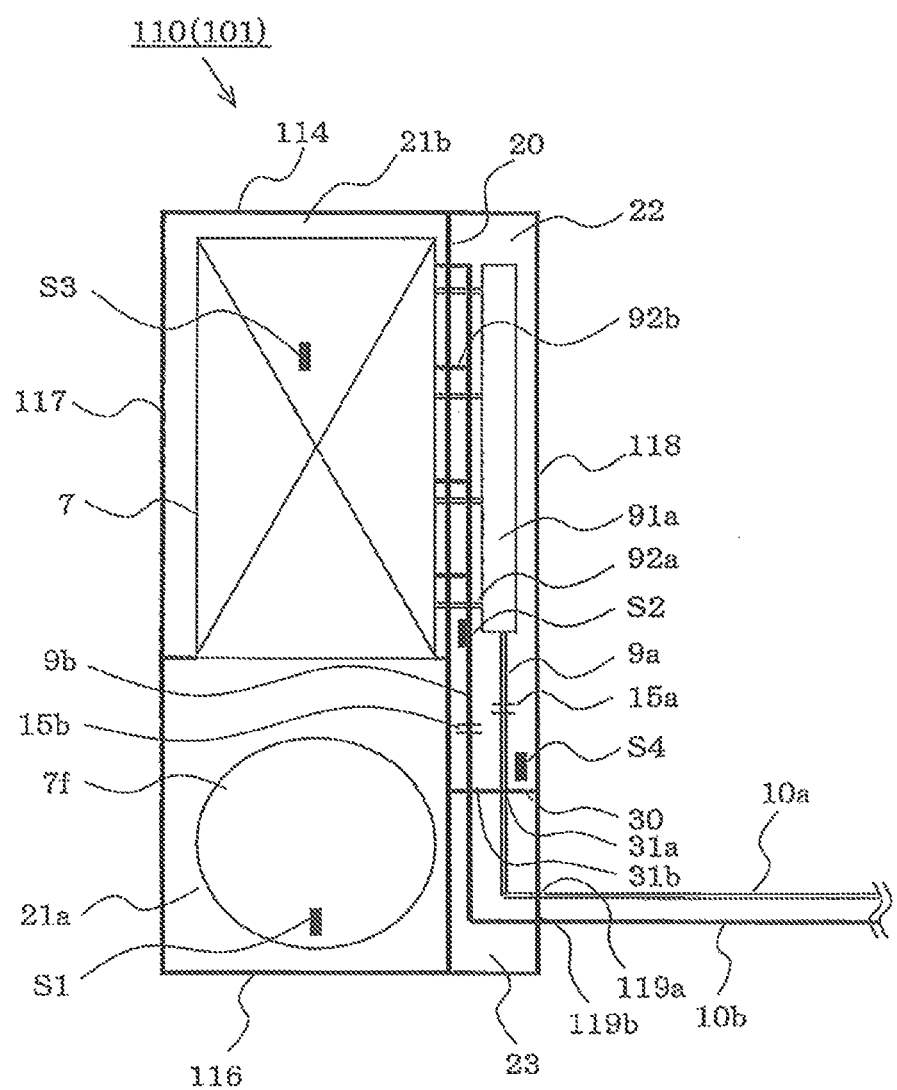
FIG. 3A is a front view illustrating an inner configuration of the indoor unit of the air-conditioning apparatus illustrated in FIG. 2.
Figure 3B:
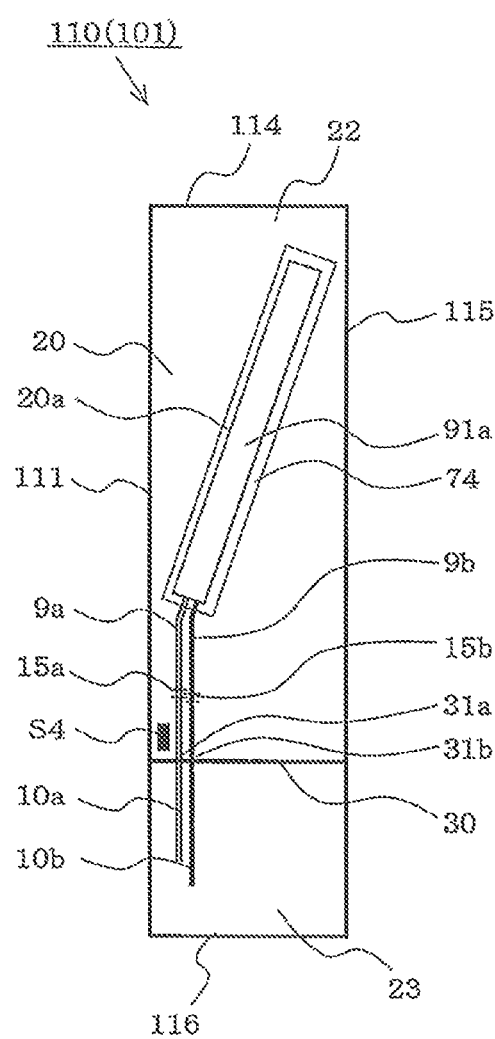
FIG. 3B is a side view illustrating the inner configuration of the indoor unit of the air-conditioning apparatus illustrated in FIG. 2.

FIGS. 2 to 3B illustrate the refrigeration cycle apparatus according to Embodiment 1 of the present invention. FIG. 2 is a front view illustrating an appearance of an indoor unit of the air-conditioning apparatus. FIG. 3A is a front view illustrating an inner configuration of the indoor unit of the air-conditioning apparatus. FIG. 3B is a side view illustrating the inner configuration of the indoor unit of the air-conditioning apparatus. These drawings are schematic views in which some members are shown transparent, and the present invention is not limited to the illustrated configuration.

In FIG. 2, the indoor unit 101 is a casing 110 including a casing front panel 111, a casing top panel 114, a casing back panel 115 (see FIG. 3B), a casing bottom panel 116, and casing side panels 117 and 118 and includes a suction port 112 formed in a lower portion of the casing front panel 111 of the casing 110 and an air outlet 113 formed in an upper portion of the casing front panel 111. Indoor air sucked through the suction port 112 changes to air (hereinafter referred to as "conditioned air") conditioned by the indoor heat exchanger 7 (see FIG. 1) and is blown into the room through the air outlet 113, thereby performing cooling or heating.

In FIGS. 3A and 3B, the inside of the casing 110 is divided (partitioned) laterally to a large degree by a vertical air passage partition 20. An air passage chamber 21 housing the indoor fan 7f and the indoor heat exchanger 7 is defined between the casing side panel 117 at one side and the air passage partition 20.

The air passage partition 20 includes an opening 20a slightly smaller than a side plate 74 constituting the indoor heat exchanger 7. Heat transmission pipes constituting the indoor heat exchanger 7 penetrate the opening 20a, and a portion close to the outer periphery of the side plate 74 is hermetically in contact with (or adhered to) the air passage partition 20 along the inner periphery of the opening 20a.

(Air Passage Chamber)

The air passage chamber 21 includes an air passage primary chamber 21a located upstream of the indoor heat exchanger 7 and housing the indoor fan 7f and an air passage secondary chamber 21b located downstream of the indoor heat exchanger 7.

The air passage primary chamber 21a faces the suction port 112, and a temperature sensor (hereinafter referred to as a "sucked air temperature sensor") S1 for measuring the temperature of sucked air is provided between the suction port 112 and the indoor fan 7f. The indoor fan 7f is driven by a motor that is not a brush type (e.g., an induction motor or a brushless DC motor), and thus, sparking, which may cause ignition in operation, does not occur.

The air passage secondary chamber 21b faces the air outlet 113, and a temperature sensor (hereinafter referred to as a "two-phase pipe temperature sensor") S3 for measuring the temperature of the indoor heat exchanger 7.

Thus, indoor air sucked into the air passage primary chamber 21a through the suction port 112 by the indoor fan 7f is changed to conditioned air by the indoor heat exchanger 7, and the conditioned air is blown into a room (not shown) through the air outlet 113 by way of the air passage secondary chamber 21b.

(Pipe Connection Chamber, Pipe Draw-out Chamber)

The space between the casing side panel 118 at the other side and the air passage partition 20 is vertically divided (partitioned) by the horizontal partition 30 so that a pipe connection chamber 22 is defined above the partition 30 and a pipe draw-out chamber 23 is defined below the partition 30.

Figure 4:
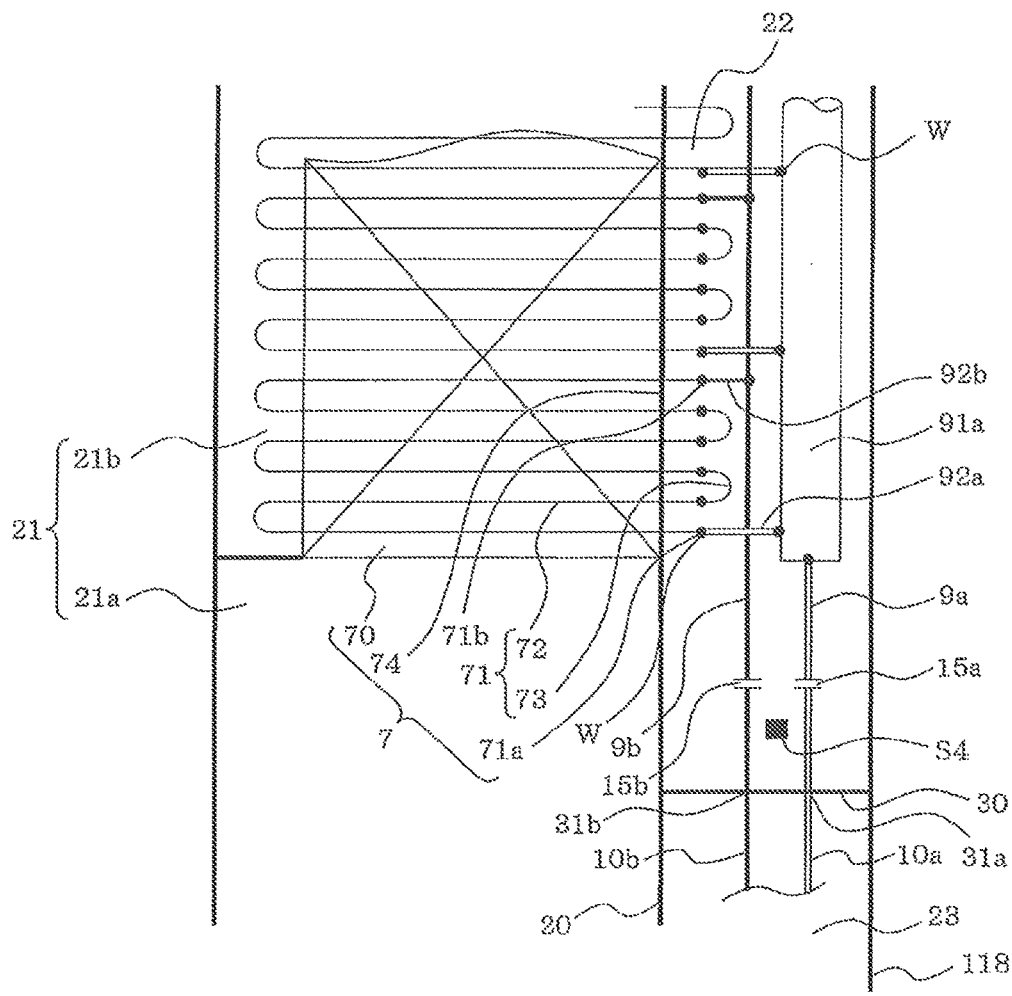
FIG. 4 is a front view schematically illustrating a state in which the indoor heat exchanger is joined to an indoor pipe in the air-conditioning apparatus illustrated in FIG. 2 in a partially enlarged manner.

The pipe connection chamber 22 houses parts of the extension pipes 10a and 10b, the flare joints 15a and 15b, the indoor pipes 9a and 9b, a header main pipe 91a, a connection portion connecting the header main pipe 91a and the indoor pipe 9a, connection portions connecting the header main pipe 91a and header branch pipes 92a, joint portions jointing the header branch pipes 92a and one end 71a of each heat transmission pipe 71 constituting the indoor heat exchanger 7, connection portions connecting the indoor pipe 9b and indoor refrigerant branch pipes 92b, and joint portions jointing the indoor refrigerant branch pipes 92b and the other end 71b of each of the heat transmission pipes 71 constituting the indoor heat exchanger 7 (see FIG. 4). The header main pipe 91a, the header branch pipes 92a, the indoor refrigerant branch pipes 92b, and the heat transmission pipes 71 will be specifically described later.

On the other hand, in the pipe draw-out chamber 23, the extension pipes 10a and 10b are arranged (i.e., L-shaped bent portions of the extension pipes 10a and 10b are located).

In the pipe connection chamber 22, a temperature sensor (hereinafter referred to as a "liquid pipe temperature sensor") S2 for measuring the temperature of the indoor pipe 9b and a temperature sensor (hereinafter referred to as a "leakage detection sensor") S4 for measuring an ambient air temperature close to the partition 30 are disposed.

That is, in a case where refrigerant leaks (which will be specifically described later), since refrigerant has a specific gravity larger than that of air, leaked refrigerant flows downward. Thus, the leakage detection sensor S4 is configured to surely detect of a temperature drop in the atmosphere due to heat of vaporization of the leaked refrigerant.

The extension pipes 10a and 10b connected to the indoor pipes 9a and 9b by the flare joints 15a and 15b are drawn to the pipe draw-out chamber 23 and arranged therein through the through holes 31a and 31b formed in the partition 30, and pass through the through holes 119a and 119b formed in the casing side panel 118 to be drawn to the outside (into the room) of the indoor unit 101.

(Joint Between Indoor Heat Exchanger and Indoor Pipe)

FIG. 4 is a front view illustrating the refrigeration cycle apparatus according to Embodiment 1 of the present invention, and schematically illustrating a state in which the indoor heat exchanger is joined to the indoor pipe in the air-conditioning apparatus in a partially enlarged manner. FIG. 4 shows the schematic view, and the present invention is not limited to the illustrated configuration.

In FIG. 4, the indoor heat exchanger 7 includes a plurality of heat radiation plates (i.e., fins) 70 that are evenly spaced from one another, a plurality of heat transmission pipes 71 penetrating the heat radiation plates 70, and a side plate 74 at the outside of the heat radiation plates 70 and facing the outermost heat radiation plate 70.

The heat transmission pipes 71 are composed of a plurality of U-shaped pipes (hereinafter referred to as "hair pins") 72 having long straight pipe portions, and arc shaped U-bends 73 having short straight pipe portions that allow the hair pins 72 to communicate with one another. The hair pins 72 are connected to the U-bends 73 at joint portions (hereinafter referred to as "welded portions W" and indicated by black circuits in the drawing). The heat transmission pipe 71 is not specifically limited in number, and may be one or two or more. The number of the hair pins 72 constituting the heat transmission pipes 71 is not specifically limited in number, either.

The gas-side indoor pipe 9a is connected to the cylindrical header main pipe 91a. The header main pipe 91a is connected to the header branch pipes 92a. Each of the header branch pipes 92a is connected to one end 71a of the corresponding heat transmission pipe 71 (i.e., the corresponding hair pin 72).

The liquid-side indoor pipe 9b is connected to the indoor refrigerant branch pipes 92b, and is branched to a plurality of parts. Each of the header branch pipes 92a is connected to the other end 71b of the corresponding heat transmission pipe 71 (i.e., the corresponding hair pin 72).

At this time, the connection between the header main pipe 91a and the header branch pipes 92a, the connection between the header branch pipes 92a and the end 71a, the connection between the indoor pipe 9b and the indoor refrigerant branch pipes 92b, and the connection between the indoor refrigerant branch pipes 92b and the end 71b are provided in the welded portions W. In the foregoing description, the joint portions are the welded portions W. However, the present invention is not limited to this example, and any joint unit may be employed.

(Penetration Pattern of Extension Pipe)

Figure 5A:
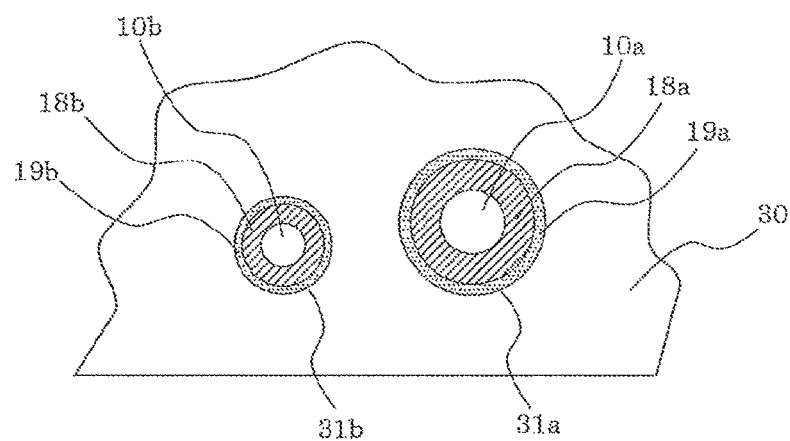
FIG. 5A is a plan view of a 2-hole type configuration in which the extension pipe of the air-conditioning apparatus illustrated in FIG. 2 penetrates a through hole in the partition.
Figure 5B:
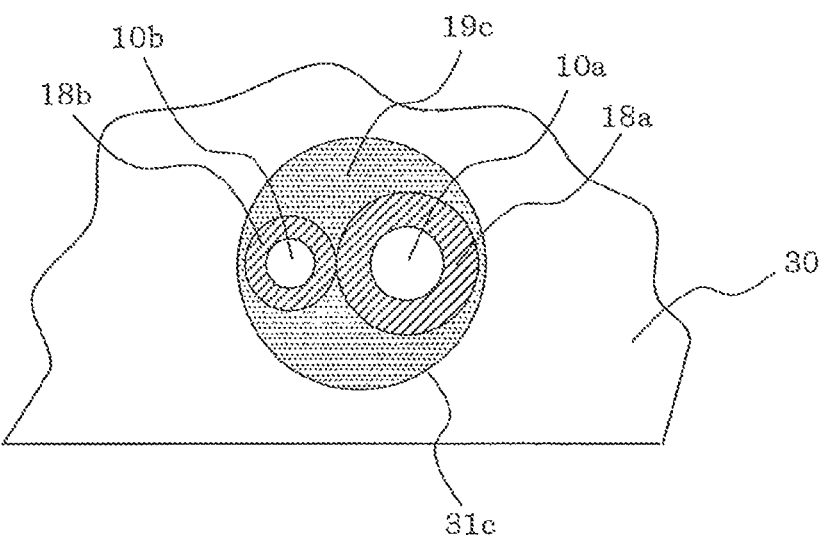
FIG. 5B is a plan view of a single-hole type configuration in which the extension pipe of the air-conditioning apparatus illustrated in FIG. 2 penetrates a through hole in the partition.
Figure 5C:
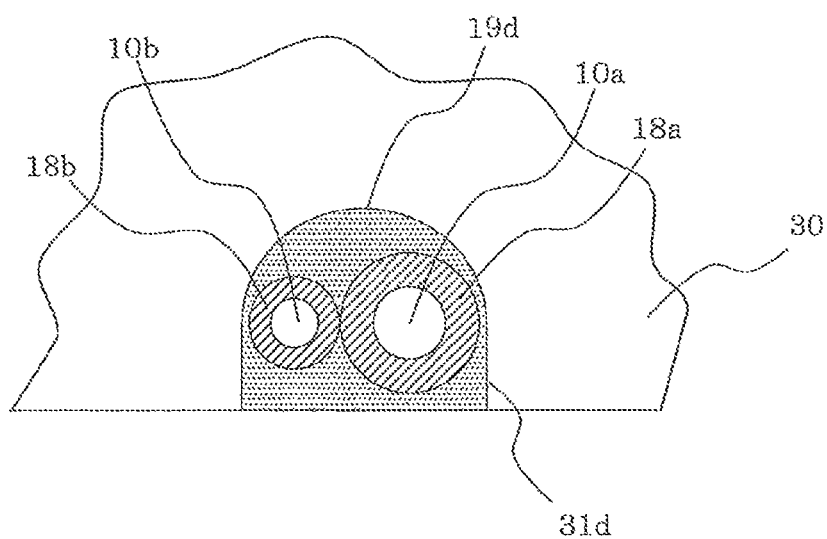
FIG. 5C is a plan view of a configuration in which the extension pipe of the air-conditioning apparatus illustrated in FIG. 2 penetrates a through hole in the partition.

FIGS. 5A to 5C are plan views illustrating the refrigeration cycle apparatus according to Embodiment 1 of the present invention, and shows various patterns in which the extension pipes of the air-conditioning apparatus penetrate the through holes in the partition. FIG. 5A shows a 2-hole type, FIG. 5B shows a single-hole type, and FIG. 5C shows a notch type. FIGS. 5A to 5C are the schematic views, and the present invention is not limited to the illustrated patterns.

In FIG. 5A, heat insulators 18a and 18b of, for example, a urethane foam material are wound around the outer periphery of the extension pipes 10a and 10b. On the other hand, the inner diameters of the through holes 31a and 31b are substantially equal to or slightly larger than the outer diameters of the surfaces of the heat insulators 18a and 18b wound around the extension pipes 10a and 10b. Thus, processing dimensions in on-site arrangement (e.g., bending and length adjustment) of the extension pipes 10a and 10b only need to be at a generally allowable level similar to levels employed in conventional techniques. That is, the efficiency of on-site construction can be enhanced.

Insulations (e.g., gap fillers) 19a and 19b each of which is a closed cell foam material are buried in gaps between the inner peripheries of the through holes 31a and 31b formed in the partition 30 and the surfaces of the heat insulators 18a and 18b. Thus, the gaps between the through holes 31a and 31b and the heat insulators 18a and 18b are hermetically sealed, and a flow of fluid (leakage) in the gaps are at a minimum level. That is, the pipe connection chamber 22 is a hermetic space.

Similarly, insulations each of which is a closed cell foam material are buried in gaps between the inner peripheries of the through holes 119a and 119b formed in the casing side panel 118 and the surfaces of the heat insulators 18a and 18b, and thus, the pipe draw-out chamber 23 is a hermetic space (see FIG. 3).

In FIG. 5B, the partition 30 has a through hole 31c through which the extension pipes 10a and 10b around which the heat insulators 18a and 5 18b are wound can penetrate, instead of the through holes 31a and 31b in FIG. 5A. An insulation (i.e., a gap filler) 19c of a closed cell foam material is buried in gaps between the inner periphery of the through hole 31c and the surfaces of the heat insulators 18a and 18b. Thus, the gaps between the inner periphery of the through hole 31c and the surfaces of the heat insulators 18a and 18b are hermetically sealed, and the pipe connection chamber 22 is a hermetic space. Since the single through hole 31c is formed, a processing man-hour is reduced to a half.

Similarly, the casing side panel 118 has a single hole through which the extension pipes 10a and 10b penetrate. The insulators 18a and 18b are wound around the extension pipes 10a and 10b, and the pipe draw-out chamber 23 is a hermetic space (see FIG. 3).

In FIG. 5C, a notch-like through hole 31d extending to a side edge of the partition 30 is formed, and an insulation (i.e., a gap filler) 19d of a closed cell foam material is buried in the gaps between the inner periphery of the through hole 31d and the surfaces of the heat insulators 18a and 18b. Thus, the gaps between the inner periphery of the through hole 31d and the surfaces of the heat insulators 18a and 18b are hermetically sealed, and the pipe connection chamber 22 is a hermetic space (see FIG. 3).

Since the through hole 31d is in the shape of a notch extending to the side edge, the extension pipes 10a and 10b do not need to penetrate the through hole 31d in the axial direction. Thus, the extension pipes 10a and 10b can be disposed in the through hole 31d only by pushing the extension pipes 10a and 10b horizontally from the side thereof, thereby enhancing an efficiency of on-site construction.

(Phenomenon in Refrigerant Leakage)

Figure 6:
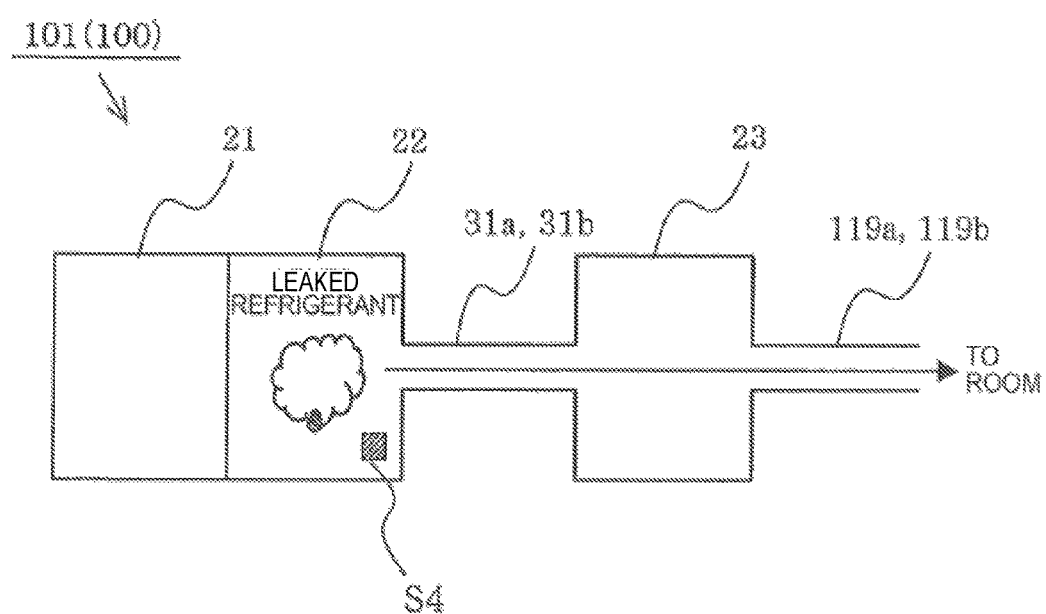
FIG. 6 schematically illustrates a phenomenon in refrigerant leakage in the air-conditioning apparatus illustrated in FIG. 2.

FIG. 6 is a view illustrating the refrigeration cycle apparatus according to Embodiment 1 of the present invention and schematically illustrating a phenomenon in refrigerant leakage in the air-conditioning apparatus.

When the air-conditioning apparatus 100 changes with age or is subjected to an excessive external force, refrigerant leakage may occur in the welded portions W (see FIG. 4) that tend to have a lower joint strength or a lower contact strength than the other portions or in the flare joints 15a and 15b. That is, refrigerant leakage is more likely to occur in the pipe connection chamber 22 than in the other portions.

When refrigerant leakage occurs in the pipe connection chamber 22, refrigerant heavier than the air descends and remains on the partition 30. Then, heat of vaporization of the leaked refrigerant reduces the ambient temperature on the partition 30, thereby ensuring that this temperature decrease can be detected by the leakage detection sensor S4.

Since the pipe connection chamber 22 has a hermetic structure, it is possible to minimize the possibility that the leaked refrigerant flows into the pipe draw-out chamber 23 through the through holes 31a and 31b (filled with the insulation 19a and 19b) in the partition 30.

Since the pipe draw-out chamber 23 also has a hermetic structure, even when refrigerant leaks into the pipe draw-out chamber 23, it is possible to minimize the possibility that this leaked refrigerant flows to the outside of the indoor unit 101 (into a room) through the through holes 119a and 119b (filled with the insulation) in the casing side panel 118.

At this time, since gaps in the through holes 30a and 30b and the through holes 119a and 119b are filled with, for example, the insulation 19a and 19b, these gaps are minimized.

That is, as illustrated in FIG. 6, the pipe connection chamber 22 and the pipe draw-out chamber 23 function as "muffler chambers" and the through holes 30a and 30b in the partition 30 and the through holes 119a and 119b in the casing side panel 118 correspond to "expansion parts." Thus, refrigerant that has leaked into the pipe connection chamber 22 has its pressure gradually reduced while passing through a leakage pathway and partially remains between the pipe connection chamber 22 and the pipe draw-out chamber 23. Accordingly, the speed (and the amount) of refrigerant that finally leaks into the room is significantly reduced.

In the case of refrigerant heavier than the air, the amount of leaked refrigerant can be reduced by forming the through holes 119a and 119b in the casing side panel 118 in a higher portion (closer to the partition 30) of the pipe draw-out chamber 23.

(Control Unit)

The control unit 1 controls the components and determines whether refrigerant leaks or not, as described later. The control unit 1 may be placed in the outdoor unit 102.

The control unit 1 receives temperature information detected by the sucked air temperature sensor S1, the liquid pipe sensor S2, and the two-phase pipe sensor S3, and controls operation of, for example, the compressor 3 to obtain operating conditions (e.g., the temperature of conditioned air, the airflow rate, the direction of an airflow) determined by, for example, an unillustrated remote controller.

In addition, when the leakage detection sensor S4 detects a decrease in the ambient air temperature, and if the amount of change of the detected temperature decreases by a predetermined threshold value or more (e.g., the difference between the previous detection value and the current detection value is 5 degrees C.), or if the degree of change of the detected temperature decreases by a value exceeding a predetermined threshold value (e.g., 5 degrees C./min.), the control unit 1 determines that refrigerant leaks, and then instructs the following operation.

(a) Drive the indoor fan 7f to stir an airflow in the room and diffuse refrigerant not to form a region (space) having a concentration exceeding a flammable concentration.

(b) Determine that the system of the air-conditioning apparatus 100 is "abnormal" and stop operations of components except the indoor fan 7f (continues stopping).

(c) Display an abnormality sign on a display unit of, for example, an unillustrated remote controller to notify a user of the abnormality.

(d) Cause a display unit or an utterance unit of, for example, the unillustrated remote controller to display or utter an instruction such as "Gas leakage occurs. Open the window" to notify the user of the instruction.

(Advantageous Effects)

In the air-conditioning apparatus 100 according to the present invention, a leakage pathway of leaked refrigerant in the indoor unit 101 is formed by serially connecting the expansion parts and the muffler chambers as described above, and thus, the following advantageous effects are obtained.

(a) Since the leakage speed of leaked refrigerant can be controlled (reduced), even when refrigerant leaks to the outside of the indoor unit 101 (into a room), a range having a high concentration of leaked refrigerant is not easily formed. Thus, formation of a region having a flammable concentration can be controlled.

(b) Since the configuration is relatively easily formed, the fabrication cost of the indoor unit can be reduced.

(c) Since the through holes through which the extension pipes penetrate have inner diameters sufficiently larger than the outer diameters of the surfaces of the heat insulators wound around the extension pipes, high accuracy is not needed for processing accuracy in on-site arrangement of the extension pipes, and a job can be easily performed at a generally allowable level similar to levels in conventional techniques.

(d) Since the extension pipes are connected to the indoor pipes by flare connection (connection using a mechanical joint), on-site construction can be performed with a general tool such as a spanner, and preparation of a welding machine and masking of peripheral portions are unnecessary. Thus, on-site construction can be easily and quickly performed.

[Embodiment 2]

Figure 7A:
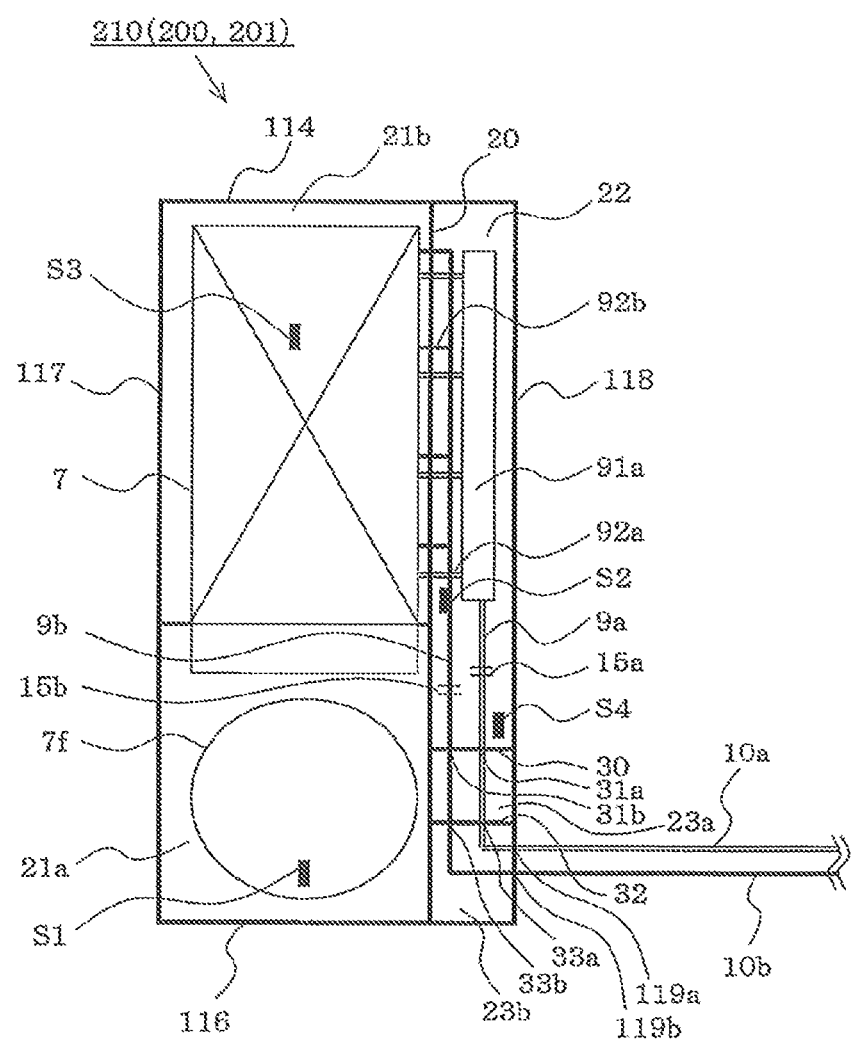
FIG. 7A is a front view illustrating an inner configuration of an indoor unit of an air-conditioning apparatus for describing a refrigeration cycle apparatus according to Embodiment 2 of the present invention.
Figure 7B:
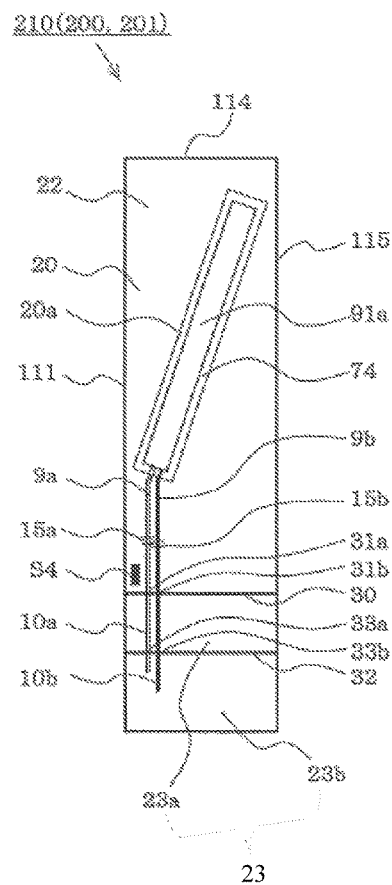
FIG. 7B is a side view illustrating the inner configuration of the indoor unit of the air-conditioning apparatus for describing the refrigeration cycle apparatus according to Embodiment 2 of the present invention.
Figure 8:
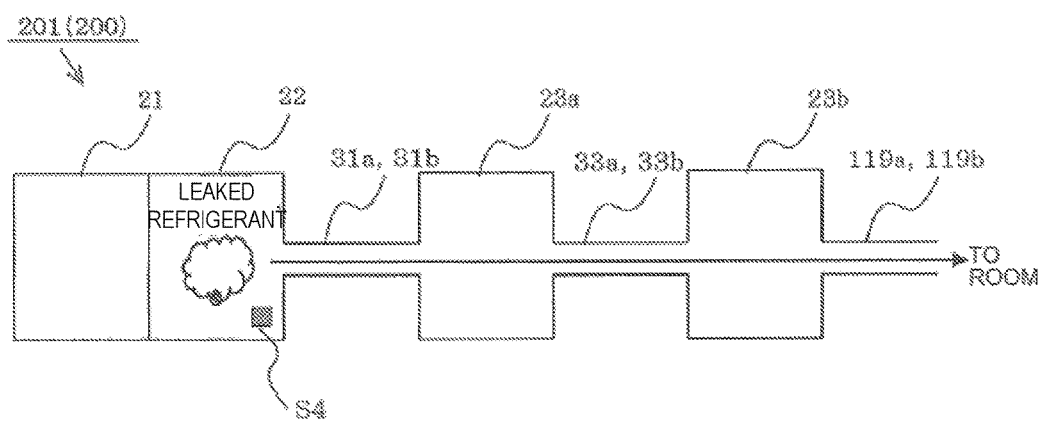
FIG. 8 schematically illustrates a phenomenon in refrigerant leakage in the air-conditioning apparatus illustrated in FIG. 7.

FIGS. 7A to 8 illustrate a refrigeration cycle apparatus according to Embodiment 2 of the present invention. FIG. 7A is a front view illustrating an inner configuration of an indoor unit of an air-conditioning apparatus. FIG. 7B is a side view illustrating the inner configuration of the indoor unit of the air-conditioning apparatus. FIG. 8 schematically illustrates a phenomenon in refrigerant leakage of the air-conditioning apparatus. Same reference signs refer to the same or equivalent components to those of Embodiment 1, and description thereof is partially omitted. FIG. 7 show schematic views in which some members are shown transparent, and the present invention is not limited to the illustrated configuration.

(Configuration of Indoor Unit)

In FIGS. 7A and 7B, an air-conditioning apparatus 200 includes an outdoor unit (not shown) and an indoor unit 201 that are connected to each other by extension pipes 10a and 10b, and the configuration of a refrigerant circuit is the same as that of the air-conditioning apparatus 100 (Embodiment 1) (see FIG. 1).

In the indoor unit 201, a pipe draw-out chamber 23 in an indoor unit 101 is vertically partitioned by an additional partition 32 so that an upper pipe draw-out primary chamber 23a and a lower pipe draw-out secondary chamber 23b are defined.

In a manner similar to the through holes 31a and 31b (hereafter, first through hole) formed in the partition 30, through holes 33a and 33b (hereafter, third through hole) are formed in the additional partition 32. In a manner similar to the penetration in the through holes 31a and 31b, insulations (i.e., gap fillers, not shown) of a closed cell foam material are buried in gaps between the inner peripheries of the through holes 33a and 33b and a heat insulator (not shown) of, for example, an urethane foam material wound around the outer peripheries of the extension pipes 10a and 10b.

That is, each of the pipe draw-out primary chamber 23a and the pipe draw-out secondary chamber 23b is a hermetic space.

In FIG. 8, in addition to the pipe connection chamber 22, the pipe draw-out primary chamber 23a and the pipe draw-out secondary chamber 23b function as two series of "muffler chambers." The first through holes 31a and 31b in the partition 30, the third through holes 33a and 33b in the additional partition 32, and through holes 119a and 119b hereafter, second through hole) in the casing side panel 118 correspond to "expansion parts."

Thus, refrigerant that has leaked into the pipe connection chamber 22 has its pressure gradually reduced while passing through a leakage pathway and partially remains among the pipe connection chamber 22, the pipe draw-out primary chamber 23a, and the pipe draw-out secondary chamber 23b. Accordingly, the speed (and the amount) of refrigerant that finally leaks into the room is significantly reduced (further reduced as compared to Embodiment 1).

The present invention is not limited to the case where the number of partitions is two, and the number of partitions may be three or more. As the number of pipe draw-out chambers increases, the leakage speed of refrigerant finally leaking into the room decreases.

In the case of refrigerant heavier than the air, the amount of leaked refrigerant can be reduced by forming the through holes 119a and 119b in the casing side panel 118 in a higher portion (closer to the additional partition 32) of the pipe draw-out secondary chamber 23b.

[Embodiment 3]

Figure 9A:
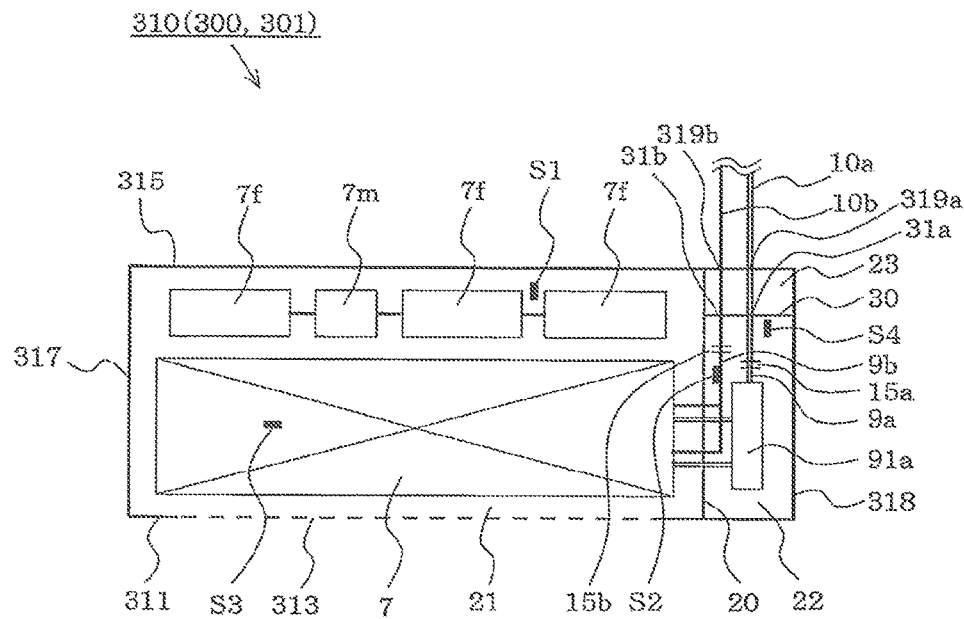
FIG. 9A is a top view illustrating an inner configuration of an indoor unit of an air-conditioning apparatus for describing a refrigeration cycle apparatus according to Embodiment 3 of the present invention.
Figure 9B:
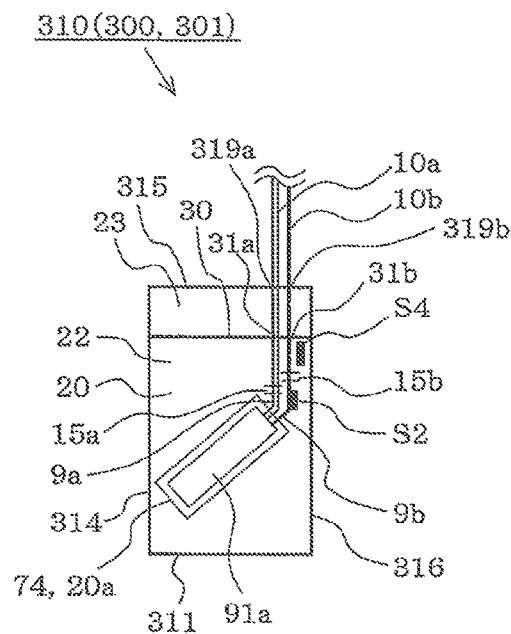
FIG. 9B is a side view illustrating the inner configuration of the indoor unit of the air-conditioning apparatus for describing the refrigeration cycle apparatus according to Embodiment 3 of the present invention.

FIGS. 9A and 9B illustrate a refrigeration cycle apparatus according to Embodiment 3 of the present invention. FIG. 9A is a top view illustrating an inner configuration of an indoor unit of an air-conditioning apparatus. FIG. 9B is a side view illustrating the inner configuration of the indoor unit of the air-conditioning apparatus. Same reference signs refer to the same or equivalent components to those of Embodiment 1, and description thereof is partially omitted. FIGS. 9A and 9B show schematic views in which some members are shown transparent, and the present invention is not limited to the illustrated configuration.

In FIGS. 9A and 9B, an air-conditioning apparatus 300 includes an outdoor unit (not shown) and an indoor unit 301 that are connected to each other by extension pipes 10a and 10b. The configuration of a refrigerant circuit is the same as that of the air-conditioning apparatus 100 (Embodiment 1) (see FIG. 1).

The indoor unit 301 is of a ceiling suspended type that is suspended from the ceiling (not shown) of a room, and includes a casing 310 housing an indoor heat exchanger 7 and indoor fans 7f therein.

An air inlet (not shown) is formed in a portion of a casing bottom panel 316 close to a casing back panel 315 in the casing 310, and an air outlet 313 is formed in the casing front panel 311.

The indoor fans 7f are disposed close to the casing back panel 315, and the indoor heat exchanger 7 is tilted toward the corner between the casing front panel 311 and a casing top panel 314.

Indoor pipes 9a and 9b are connected to the indoor heat exchanger 7 at locations close to a casing side panel 318, and the indoor pipes 9a and 9b are connected to the extension pipes 10a and 10b by flare joints 15a and 15b. The configuration having such a connection is the same as that in Embodiment 1 (welded portions W, see FIG. 4), and thus, description thereof is not repeated. Although the three indoor fans 7f are rotated by one fan motor 7m, alternatively, the fan motors 7m are individually connected to the indoor fans 7f so that the indoor fans 7f rotate independently of each other.

In the casing 310, an air passage chamber 21 is defined between a casing side panel 317 at one side and an air passage partition 20, and a pipe connection chamber 22 and a pipe draw-out chamber 23 separated by a partition 30 are defined between a casing side panel 318 at the other end and the air passage partition 20.

The partition 30 is oriented in parallel with the casing back panel 315. The extension pipes 10a and 10b penetrate through holes 31a and 31b formed in the partition 30 and through holes 319a and 319b formed in the casing back panel 315. The way of such penetration is the same as that in Embodiment 1 (see FIG. 5).

That is, in a manner similar to the air-conditioning apparatus 100 (Embodiment 1), a leakage pathway of leaked refrigerant in the indoor unit 301 of the air-conditioning apparatus 300 is formed by serially connecting expansion parts and muffler chambers. Thus, the air-conditioning apparatus 300 has advantageous effects similar to those of the air-conditioning apparatus 100 (see FIG. 6). An additional partition 32 may be further additionally provided.

[Embodiment 4]

Figure 10A:
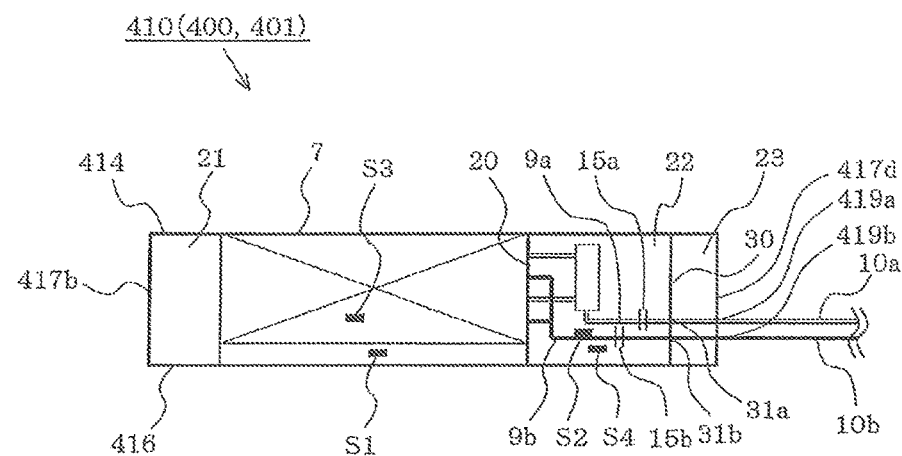
FIG. 10A is a side view illustrating an inner configuration of an indoor unit of an air-conditioning apparatus for describing a refrigeration cycle apparatus according to Embodiment 4 of the present invention.
Figure 10B:
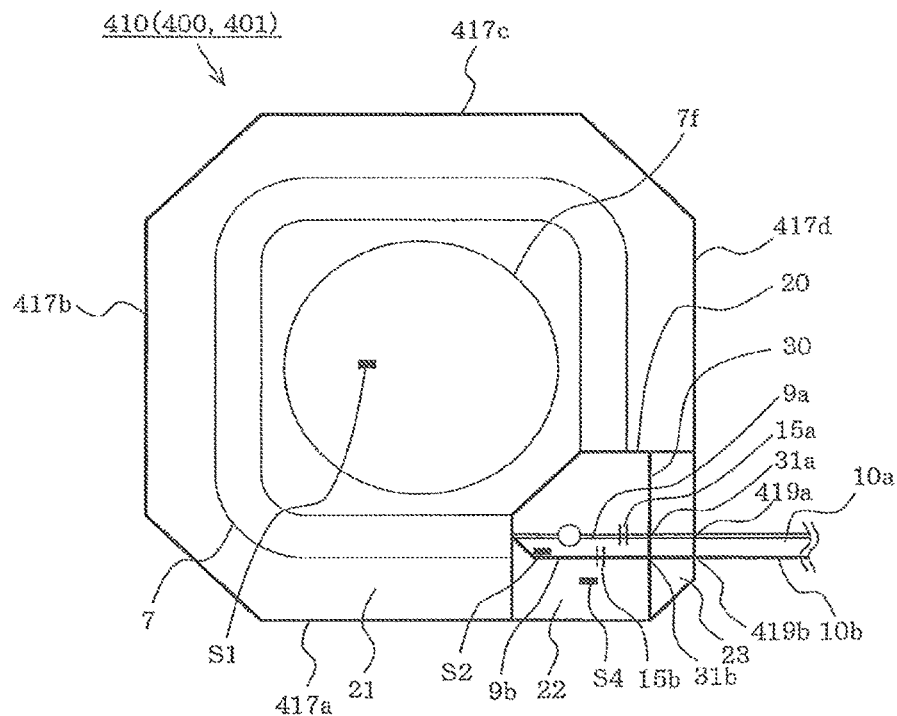
FIG. 10B is a bottom view illustrating the inner configuration of the indoor unit of the air-conditioning apparatus for describing the refrigeration cycle apparatus according to Embodiment 4 of the present invention.

FIGS. 10A and 10B illustrate a refrigeration cycle apparatus according to Embodiment 4 of the present invention. FIG. 10A is a side view illustrating an inner configuration of the indoor unit of an air-conditioning apparatus. FIG. 10B is a bottom view illustrating the inner configuration of the indoor unit of the air-conditioning apparatus. Same reference signs refer to the same or equivalent components to those of Embodiment 1, and description thereof is partially omitted. FIGS. 10A and 10B show schematic views in which some members are shown transparent, and the present invention is not limited to the illustrated configuration. Embodiment 4 of the present invention. FIG. 10A is a side view illustrating an inner configuration of an indoor unit of an air-conditioning apparatus. FIG. 10B is a bottom view illustrating the inner configuration of the indoor unit of the air-conditioning apparatus. Same reference signs refer to the same or equivalent components to those of Embodiment 1, and description thereof is partially omitted. FIG. 10 show schematic views in which some members are shown transparent, and the present invention is not limited to the illustrated configuration.

In FIGS. 10A and 10B, an air-conditioning apparatus 400 includes an outdoor unit (not shown) and an indoor unit 401 that are connected to each other by extension pipes 10a and 10b. The configuration of a refrigerant circuit is the same as that of the air-conditioning apparatus 100 (Embodiment 1) (see FIG. 1).

The indoor unit 401 of the air-conditioning apparatus 400 is of a ceiling cassette type that is embedded in the ceiling (not shown) of a room in installation, and includes a casing 410 housing an indoor heat exchanger 7 and an indoor fan 7f therein.

The casing 410 is a square box whose corners are chamfered in cross section, and a decorative grille (not shown) is detachably provided to a casing bottom panel 416 having an opening. The decorative grille has an air inlet in a center portion thereof, and air outlets are formed at four locations around the air inlet. The indoor fan 7f is provided at a center of a casing top panel 414, and the square ring-shaped indoor heat exchanger 7 is disposed to surround the indoor fan 7f. Thus, indoor air sucked through the air inlet by the indoor fan 7f is subjected to heat exchange in the indoor heat exchanger 7 and is brown into a room (not shown) from the outside of the indoor heat exchanger 7 through the air outlet.

Flare joints 15a and 15b are disposed at the corner between a casing side panel 417a and a casing side panel 417d among casing side panels 417a, 417b, 417c, and 417d constituting the casing 410. At this corner, indoor pipes 9a and 9b are connected to the extension pipes 10a and 10b, and the indoor heat exchanger 7 is connected to the indoor pipes 9a and 9b. The configuration of such connection is the same as that in Embodiment 1 (welded portions W, see FIG. 4), and thus, description thereof is not repeated.

An air passage partition 20 is disposed close to the corner in which the flare joints 15a and 15b are disposed. A part of the casing side panel 417a, the casing side panel 417b, the casing side panel 417c, a part of the casing side panel 417d, and the air passage partition 20 define an air passage chamber 21.

A region surrounded by a part of the casing side panel 417a, a part of the casing side panel 417d, and the air passage partition 20 is partitioned into a pipe connection chamber 22 and a pipe draw-out chamber 23 by a partition 30. The partition 30 is in parallel with the casing side panel 417d. The extension pipes 10a and 10b penetrate through holes 31a and 31b formed in the partition 30 and through holes 419a and 419b formed in the casing side panel 417d. The way of such penetration is the same as that in Embodiment 1 (see FIG. 5).

That is, in a manner similar to the air-conditioning apparatus 100 (Embodiment 1), a leakage pathway of leaked refrigerant in the indoor unit 401 of the air-conditioning apparatus 400 is formed by serially connecting expansion parts and muffler chambers. Thus, the air-conditioning apparatus 400 has advantageous effects similar to those of the air-conditioning apparatus 100 (see FIG. 6). An additional partition 32 may be further additionally provided.

[Embodiment 5]

Figure 11:
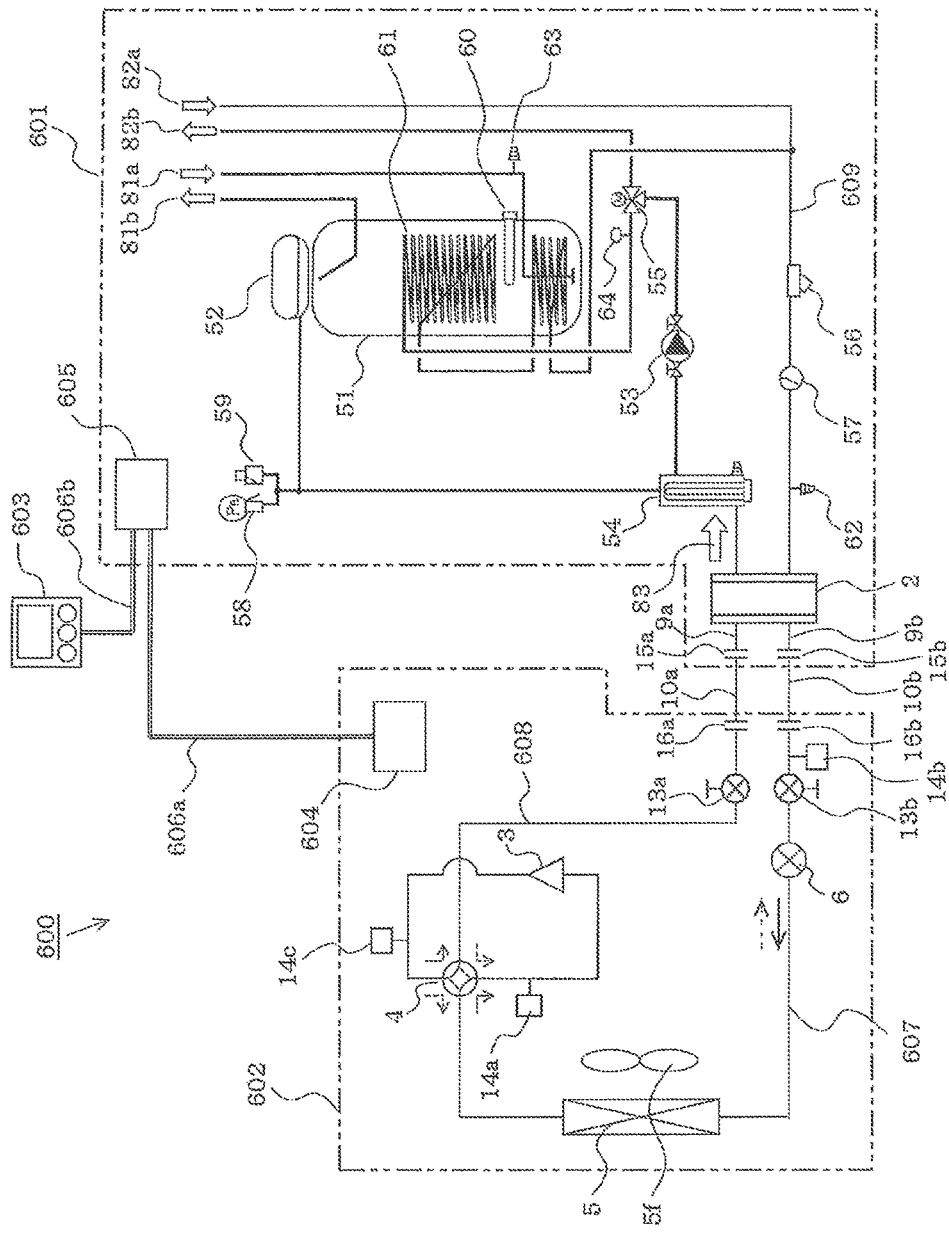
FIG. 11 is a circuit diagram illustrating refrigerant and water circuits of a heat pump cycle hot water supply system for describing a refrigeration cycle apparatus according to Embodiment 5 of the present invention.
Figure 12:
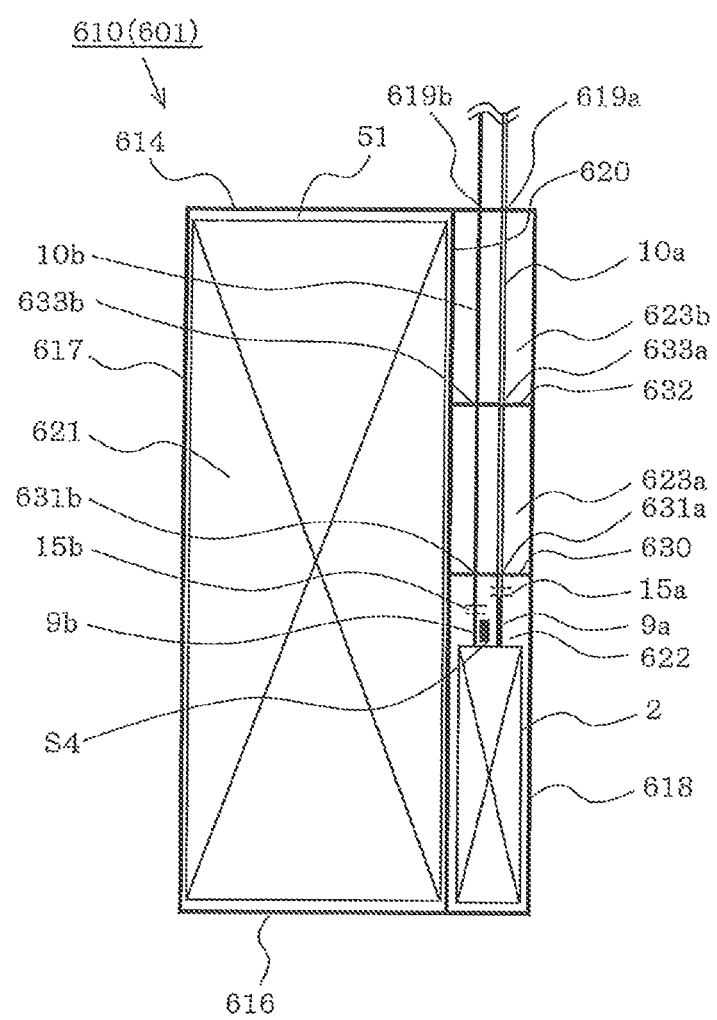
FIG. 12 is a front view illustrating a hot water supply unit of the heat pump cycle hot water supply system for describing the refrigeration cycle apparatus according to Embodiment 5 of the present invention.

FIGS. 11 and 12 illustrate a refrigeration cycle apparatus according to Embodiment 5 of the present invention. FIG. 11 is a circuit diagram illustrating refrigerant and water circuits of a heat pump cycle hot water supply system. FIG. 12 is a front view in which a hot water supply unit of the heat pump cycle hot water supply system is partially shown transparent. Components that are the same or equivalent to those of Embodiment 1 are denoted by reference signs that are the same in the last two digits as those used in Embodiment 1, and description thereof is partially omitted. FIG. 12 is a schematic view, and the present invention is not limited to the illustrated configuration.

(Hot Water Supply System)

In FIG. 11, a hot water supply system 600 includes a heat pump heat source unit (corresponding to an outdoor unit, hereinafter referred to as a "heat source unit") 602, and a hot water supply unit (corresponding to an indoor unit) 601 that receives heating energy or cooling energy from the heat source unit 602.

A refrigerant pipe 607 included in the heat source unit 602 is connected to indoor pipes 9a and 9b connected to a water heat exchanger 2 included in the hot water supply unit 601 through pipes (hereinafter referred to as "extension pipes") 10a and 10b, thereby forming a refrigerant circuit 608. The refrigerant pipe 607 is connected to extension pipes 10a and 10b by flare joints 16a and 16b. The indoor pipes 9a and 9b are connected to the extension pipes 10a and 10b by flare joints 15a and 15b.

The hot water supply unit 601 includes a water circuit 609. The refrigerant circuit 608 is thermally connected to the water circuit 609 in the water heat exchanger 2 (more accurately, refrigerant and water passing through the water heat exchanger 2 exchange heat).

When the heat source unit 602 performs a heating hot water supply operation (hereinafter referred to as a "normal operation") for heating water flowing in the hot water supply unit 601, refrigerant flows in the direction indicated by solid arrows so that refrigerant transfers heating energy to water.

On the other hand, when heat source unit 602 performs a "defrosting operation (cooling operation)" in which refrigerant flows in a reverse cycle, the opposite direction (indicated by dotted arrows) to the normal operation, refrigerant takes heating energy from water and cools water flowing in the hot water supply unit 601.

In the hot water supply unit 601, in any of the normal operation and the defrosting operation, water in the water circuit 609 is caused to circulate by a pump 53 in a direction indicated by an arrow 83. These will be described specifically.

(Configurations of Heat Source Unit and Refrigerant Circuit)

In FIG. 11, the heat source unit 602 includes a compressor 3, a four-way valve 4, an expansion valve 6, an outdoor heat exchanger (i.e., air heat exchanger) 5 that are connected to one another by refrigerant pipes 607, and further connected to the water heat exchanger 2 (e.g., an indoor heat exchanger) provided in the hot water supply unit 601 and the extension pipes 10a and 10b, thereby constituting a refrigerant circuit 608. The heat source unit 602 also includes a controller 604 for controlling driving of actuators of the compressor 3, the four-way valve 4, and the expansion valve 6.

The compressor 3 compresses sucked refrigerant and discharges the compressed refrigerant. The compressor 3 includes an inverter, for example, and changes a driving frequency as intended to minutely change the capacity (the amount of refrigerant fed in a unit time) of the compressor 3. However, the present invention is not limited to this example.

The four-way valve 4 switches the circulation direction of refrigerant in the normal operation and the defrosting operation. In the pipe connection relationship in the refrigerant circuit 608, a suction side and a discharge side of the compressor 3 can be replaced with each other.

The water heat exchanger 2 exchanges heat between water flowing in the water circuit 609 and refrigerant flowing in the refrigerant circuit 608. The water heat exchanger 2 is a plate heat exchanger, and includes a refrigerant channel and a water channel partitioned from each other by a partition. Refrigerant flowing in the refrigerant channel and water flowing in the water channel exchange heat through the partition (both not shown). A refrigerant connection portion communicating with the refrigerant channel and a water connection portion communicating with the water channel are provided. The refrigerant connection portion is connected to the indoor pipes 9a and 9b, and the water connection portion is connected to the water circuit 609.

The water heat exchanger 2 serves as a radiator (condenser) in a normal operation and heats water flowing in the water circuit 609 (cools refrigerant). On the other hand, the water heat exchanger 2 serves as a heat absorber (evaporator) that takes heat from water in the water circuit 609 in a defrosting operation, and cools water (heats refrigerant).

In the present invention, the water heat exchanger 2 is not limited to the plate heat exchanger.

The expansion valve 6 adjusts the flow rate of refrigerant, and makes pressure adjustment (pressure reduction) of refrigerant flowing in the water heat exchanger 2. The expansion valve 6 is an electronic expansion valve that can change the opening degree based on an instruction from the controller 604.

The outdoor heat exchanger 5 exchanges heat between refrigerant and air (outdoor air) outside a room from the outdoor fan 5f. The outdoor heat exchanger 5 serves as a heat absorber (evaporator) (heats refrigerant) in the normal operation, and serves as a radiator (condenser) (cools refrigerant) in the defrosting operation.

(Refrigerant)

As refrigerant flowing in the refrigerant circuit 608 constituted by the heat source unit 602, the following single component refrigerant or a mixed refrigerant including the following single component refrigerant is used. These refrigerants have a low environment load, such as a low global warming potential, but is flammable.

(1) "R32 (difluoromethane)", which is a hydrofluorocarbon-based single component refrigerant (2) Hydrofluoroolefin-based refrigerants "HFO-1234yf" and "HFO-1234ze" (these refrigerants will be hereinafter referred to as "HFO")

(3) Hydrocarbon-based "R290 (propane)" or "R1270 (propylene)"

(Controller of Heat Source Unit)

The controller 604 of the heat source unit 602 can communicate with a controller 605 (which will be described later) of the hot water supply unit 601 and a remote controller (which will be described later) 603 through control lines 606a and 606b. However, the present invention is not limited to this example, and these components may wirelessly communicate with each other.

The controller 604 receives signals including data on physical quantities related to detection by a temperature sensor (not shown) and a pressure sensor (not shown), data on an instruction based on the type of operation input by a user of the hot water supply system 600, and data on, for example, the type of operation from the controller 605 of the hot water supply unit 601, for example, and controls driving of the compressor 3, channel switching of the four-way valve 4, the rotation speed (the amount of fan blast to the outdoor heat exchanger 5) of the outdoor fan 5f, and the opening degree of the expansion valve 6, for example.

(Operation of Heat Source Unit)

Then, operational behavior of the heat source unit 602 will be described based on a flow of refrigerant in the refrigerant circuit 608. As described above, the actuators of, for example, the four-way valve 4 are controlled by the controller 604. The levels of, for example, temperature and pressure are not determined based on specific absolute values, and are determined relative to the states, operation, and other factors in, for example, a system or a device.

(Operation in Normal Operation)

In a normal operation, the controller 604 switches the four-way valve 4 to the channel indicated by solid lines in FIG. 11. Thus, in the normal operation, refrigerant circulates in the compressor 3, the four-way valve 4, the water heat exchanger 2, the expansion valve 6, the outdoor heat exchanger 5, the four-way valve 4, and the compressor 3 in this order, and thus, these components function as follows.

(1) High-temperature high-pressure gaseous refrigerant (gas refrigerant) discharged from the compressor 3 flows into the water heat exchanger 2 through the four-way valve 4. Then, the gas refrigerant that has flowed into the water heat exchanger 2 is subjected to condensation liquefaction while transferring heat in the water heat exchanger 2 functioning as a condenser, and becomes high-pressure low-temperature liquefied refrigerant (liquid refrigerant).

(2) On the other hand, load-side water passing through the water heat exchanger 2 (water flowing in the water circuit 609) is heated by heat transferred from refrigerant passing through the water heat exchanger 2.

(3) The high-pressure low-temperature liquid refrigerant that has flowed out of the water heat exchanger 2 has its pressure reduced in the expansion valve 6, and reaches a two-phase gas-liquid state.

(4) Then, the refrigerant flows into the outdoor heat exchanger 5 functioning as an evaporator, absorbs heat from air in the outdoor heat exchanger 5 to be evaporated and gasified.

(5) The gasified refrigerant passes through the outdoor heat exchanger 5 and then the four-way valve 4, and is sucked into the compressor 3.

(Operation in Defrosting Operation)

In a defrosting operation, the controller 604 switches the four-way valve 4 to the channel indicated by dotted lines in FIG. 11. At this time, refrigerant in the defrosting operation flows in a reverse cycle (cooling operation) as described above, the components function as follows.

(1) High-temperature high-pressure gas refrigerant discharged from the compressor 3 flows into the outdoor heat exchanger 5 through the four-way valve 4. At this time, the refrigerant exchanges heat with frost on the outdoor heat exchanger 5 so that frost melts and refrigerant flows out of the outdoor heat exchanger 5 in the state of liquid refrigerant. The refrigerant reaches a two-phase gas-liquid state through the expansion valve 6 and flows into the water heat exchanger 2 (evaporator).

(2) The refrigerant that has flowed into the water heat exchanger 2 absorbs heat from water passing through the water heat exchanger 2 and flowing in the water circuit 609 to be evaporated and become gas refrigerant in the water heat exchanger 2. At this time, the temperature of the outdoor heat exchanger 5 itself increases, and thus, frost on the outdoor heat exchanger 5 melts and drops (defrosted).

(3) Gas refrigerant that has flowed out of the water heat exchanger 2 returns to the compressor 3 again through the four-way valve 4.

(Configuration of Hot Water Supply Unit)

The hot water supply unit 601 includes a tank 51, the water heat exchanger 2, a pump 53, a booster heater 54, a three-way valve 55 (an example of a branching device), a strainer 56, a flow switch 57, an expansion tank 52, a pressure release valve 58, and an air purge valve 59. These components are connected to one another by pipes, and constitute a water circuit 609.

A drain port 62 for draining water in the water circuit 609 is provided in the pipes constituting the water circuit 609. The hot water supply unit 601 includes a controller 605 for controlling driving of actuators of the pump 53, the booster heater 54, and the three-way valve 55. These components will be specifically described.

The tank 51 is a device in which water (actually heated water (hot water)) is stored. The tank 51 incorporate a coiled pipe part (hereinafter referred to as a "coil") 61 constituting a part of the water circuit 609. The coil 61 exchanges heat between water (hot water) circulating in the water circuit 609 and water remaining in the tank 51 to heat the water remaining in the tank 51. The tank 51 incorporates an immersion heater 60. The immersion heater 60 is a heating unit for further heating water remaining in the tank 51, in a case where the heat source unit 602 has an insufficient heating capacity, for example.

In addition, the tank 51 is covered with a heat insulator (not shown) to prevent water remaining therein from being cooled by outside air. The heat insulator is, for example, a felt, Thinsulate (registered trademark), vacuum insulation panel (VIP).

Water in the tank 51 flows out into a sanitary circuit side pipe 81b connected to, for example, a shower (not shown). A part or all of water that has flowed out can return from the sanitary circuit side pipe 81a into the tank 51. The sanitary circuit side pipe 81a also has a drain port 63.

The pump 53 is a device that applies a pressure to water in the water circuit 609 so that water circulates in the water circuit 609.

The three-way valve 55 is a device for branching water in the water circuit 609. For example, the three-way valve 55 switches the direction of flow of water in the water circuit 609 toward the tank 51 so that water circulates by way of the tank 51, or switches to the direction to a heating circuit side pipe 82b connected to an outside radiator, a heating machine (not shown) such as a floor heating so that water circulates through the heating machine (not shown) and the heating circuit side pipe 82a (not through the tank 51 at this time).

The strainer 56 is a device for removing a scale (deposit) in the water circuit 609. The flow switch 57 is a device for detecting whether the flow rate of water circulating in the water circuit 609 is a predetermined level or more.

The expansion tank 52 is a device for controlling a pressure that changes with a change in the volume of water in the water circuit 609 caused by, for example, heating, within a predetermined range.

The pressure release valve 58 is a protection device. When the pressure in the water circuit 609 increases above the pressure control range of the expansion tank 52, the pressure release valve 58 releases water in the water circuit 609 to the outside.

The air purge valve 59 releases water, for example, generated in the water circuit 609 to the outside to prevent the pump 53 from idling (air entrainment in the pump 53).

A manual air purge valve 64 is a manual valve for removing air from the water circuit 609. For example, the manual air purge valve 64 is used for removing air mixed in the water circuit 609 in filling water in installation.

(Controller of Hot Water Supply Unit)

The controller 605 of the hot water supply unit 601 receives a detection signal of a sensor (not shown) that detects the amount and temperature of water in the tank 51 and a detection signal of a pressure sensor (not shown) placed in the sanitary circuit side pipe 81b or the heating circuit side pipe 82b, transmits a data signal on, for example, the type of operation to the controller 604 of the heat source unit 602, and controls operation of the pump 53.

The controller 605 of the hot water supply unit 601 can communicate with the remote controller 603 through a control line 606b. However, the present invention is not limited to this example, and these components may wirelessly communicate with each other. The controller 604 and the controller 605 are separated from each other. However, the present invention is not limited to this example, and the controller 604 and the controller 605 may be united so that this unit is disposed in one of the hot water supply unit 601 or the heat source unit 602.

(Configuration of Hot Water Supply Unit)

In FIG. 12, the hot water supply unit 601 is a casing 610 including at least a casing top panel 614, a casing bottom panel 616, and casing side panels 617 and 618. Extension pipes 10a and 10b are drawn to the outside of the casing 610 through through holes 619a and 619b formed in the casing top panel 614.

A partition 620 extends vertically in the casing 610, and a tank chamber 621 housing the tank 51 is defined between casing side panel 617 at one side and the partition 620.

Partitions 630 and 632 extend horizontally between the casing side panel 618 at the other side and the partition 620. In this manner, a pipe connection chamber 622 housing the water heat exchanger 2 and flare joints 15a and 15b are defined between the casing bottom panel 616 and the partition 630, a pipe draw-out primary chamber 623a through which the extension pipes 10a and 10b pass is defined between the partition 630 and the partition 632, and a pipe draw-out secondary chamber 623b through which the extension pipes 10a and 10b pass is defined between the partition 632 and the casing top panel 614.

At this time, the configuration in which the extension pipes 10a and 10b pass through the through holes 631a and 631b formed in the partition 630, the configuration in which the extension pipes 10a and 10b passes through through holes 633a and 633b formed in the partition 632, and the configuration in which the extension pipes 10a and 10b pass through the through holes 619a and 619b formed in the casing top panel 614 are the same as those in the air-conditioning apparatus 200 (see FIG. 7) described in Embodiment 2.

Thus, each of the pipe connection chamber 622, the pipe draw-out primary chamber 623a, and pipe draw-out secondary chamber 623b is a hermetic space. That is, in addition to the pipe connection chamber 622, the pipe draw-out primary chamber 623a and the pipe draw-out secondary chamber 623b function as two series of "muffler chambers" and the through holes 631a and 631b in the partition 630, the through holes 633a and 633b in the partition 632, and the through holes 619a and 619b in the casing top panel 614 correspond to "expansion parts" (see FIG. 8).

Thus, refrigerant that has leaked into the pipe connection chamber 622 has its pressure gradually reduced while passing through a leakage pathway, and leaked refrigerant partially remains among the pipe connection chamber 622, the pipe draw-out primary chamber 623a, and the pipe draw-out secondary chamber 623b. Thus, the leakage speed (and the leakage amount) of refrigerant that finally leaks into a room significantly decreases.

The number of partitions is not limited to two in the present invention, and may be one or three or more. As the number of pipe draw-out chambers increases, advantageous effects thereof are enhanced.

Although the air-conditioning apparatuses 100 to 400 have been described in Embodiments 1 to 4 and the hot water supply system 600 has been described in Embodiment 5, the present invention is not limited to those examples. Any refrigeration cycle apparatus may be employed as long as a refrigeration cycle can be performed.

REFERENCE SIGNS LIST

1 control unit 2 water heat exchanger 3 compressor 4 four-way valve 5 outdoor heat exchanger 5f outdoor fan 6 expansion valve 7 indoor heat exchanger 7f indoor fan 7m fan motor 8 outdoor pipe 9a indoor pipe 9b indoor pipe 10a extension pipe 10b extension pipe 11 suction pipe 12 discharge pipe 13a extension pipe connecting valve 13b extension pipe connecting valve 14a service port 14b service port 14c service port 15a flare joint 15b flare joint 16a flare joint 16b flare joint 18a heat insulator 18b heat insulator 19a insulation 19b insulation 20 air passage partition 20a opening 21 air passage chamber 21a air passage primary chamber 21b air passage secondary chamber22 pipe connection chamber23 pipe draw-out chamber 23a pipe draw-out primary chamber 23b pipe draw-out secondary chamber 30 partition 30a through hole 31a through hole 31b through hole 31c through hole 31d through hole 32 additional partition 33a through hole 33b through hole 51 tank 52 expansion tank 53 pump 54 booster heater 55 three-way valve 56 strainer 57 flow switch 58 pressure release valve 59 air purge valve 60 immersion heater 61 coil 62 drain port 63 drain port 64 manual air purge valve 70 heat radiation plate 71 heat transmission pipe 71a end 71b end 72 hair pin 73 U-bend 74 side plate 81a sanitary circuit side pipe 81b sanitary circuit side pipe 82a heating circuit side pipe 82b heating circuit side pipe 83 arrow 91a header main pipe 92a header branch pipe 92b indoor refrigerant branch pipe 100 air-conditioning apparatus (Embodiment 1) 101 indoor unit 102 outdoor unit 110 casing 111 casing front panel 112 suction port 113 air outlet 114 casing top panel 115 casing back panel 116 casing bottom panel 117 casing side panel 118 casing side panel 119a through hole 200 air-conditioning apparatus (Embodiment 2) 201 indoor unit 300 air-conditioning apparatus (Embodiment 3) 301 indoor unit 310 casing311 casing front panel 313 air outlet 314 casing top panel 315 casing back panel 316 casing bottom panel 317 casing side panel 318 casing side panel 319a through hole 319bthrough hole400 air-conditioning apparatus (Embodiment 4) 401 indoor unit 410 casing414 casing top panel 416 casing bottom panel 417a casing side panel 417b casing side panel 417c casing side panel 417d casing side panel 419a through hole 419b through hole 600 hot water supply system (Embodiment 5) 601 hot water supply unit 602 heat source unit 603 remote controller 604 controller 605 controller 606a control line 606b control line 607 refrigerant pipe 608 refrigerant circuit 609 water circuit 610 casing614 casing top panel 616 casing bottom panel 617 casing side panel 619a through hole 620 partition 621 tank chamber 622 pipe connection chamber 623a pipe draw-out primary chamber 623b pipe draw-out secondary chamber 630 partition 631a through hole 631b through hole 632 partition 633a through hole 633b through hole S1 sucked air temperature sensor S2 liquid pipe temperature sensor S3 two-phase pipe temperature sensor S4 leakage detection sensor

The invention claimed is:

1. A refrigeration cycle apparatus using a flammable refrigerant, the refrigeration cycle apparatus comprising:
   an outdoor unit including at least a compressor and an outdoor pipe;
   an indoor unit including at least an indoor heat exchanger and an indoor pipe;
   an extension pipe connecting the outdoor pipe and the indoor pipe to each other;
   a pipe connection chamber disposed in a casing constituting the indoor unit and housing part of the indoor pipe and the extension pipe;
   a pipe draw-out chamber disposed in and defined by the casing constituting the indoor unit, the extension pipe drawn out from the pipe connection chamber passing through the pipe draw-out chamber; and a partition having a first through hole, the pipe connection chamber and the pipe draw-out chamber being partitioned from each other by the partition having the first through hole, the extension pipe penetrating the first through hole, the part of the pipe draw-out chamber that is defined by a part of the casing constituting the indoor unit, the extension pipe penetrating a second through hole formed in the part of the casing, wherein the pipe draw-out chamber is a first hermetic space, and wherein the pipe connection chamber is a second hermetic space.

2. The refrigeration cycle apparatus of claim 1, wherein the pipe draw-out chamber is divided into a plurality of chambers by one additional partition, the additional partition has a third through hole, the extension pipe further penetrating the third through hole, and the extension pipe serially and sequentially passes through the plurality of chambers of the pipe draw-out chamber.

3. The refrigeration cycle apparatus of claim 1, wherein the second through hole in the pipe draw-out chamber is located in an upper portion of the casing or a top panel of the casing, the extension pipe penetrating the second through hole in the pipe draw-out chamber.

4. The refrigeration cycle apparatus of claim 1, wherein the indoor heat exchanger includes a plurality of heat radiation plates spaced from one another, and a heat transmission pipe penetrating the plurality of heat radiation plates in a serpentine manner, and the pipe connection chamber houses a joint which joins the heat transmission pipe and the indoor pipe.

5. The refrigeration cycle apparatus of claim 1, wherein the indoor heat exchanger includes a refrigerant channel and a water channel adjacent to each other, and a refrigerant connection portion communicating with the refrigerant channel, and the pipe connection chamber houses the refrigerant connection portion.

6. The refrigeration cycle apparatus of claim 1, wherein the indoor pipe and the extension pipe are connected to each other by a mechanical joint.

7. The refrigeration cycle apparatus of claim 1, wherein a gap between an outer periphery of the extension pipe and an inner periphery of the first through hole is filled with a gap filler of a closed cell foam material.

8. The refrigeration cycle apparatus of claim 1, wherein the refrigerant is one of a single component HFC refrigerant of R32 ($CH_2F_2$ : difluoromethane), HFO-1234 yf ($CF_3$ $CF=CH_2$ : tetrafluoropropene), or HFO-1234 ze ($CF_3-CH=CHF$), or a mixed refrigerant of these single component refrigerants.

9. The refrigeration cycle apparatus of claim 1, wherein the pipe connection chamber and the pipe draw-out chamber are vertically partitioned from each other by the partition which is disposed horizontally, the pipe connection chamber is defined above the partition, and the pipe draw-out chamber is defined below the partition.

10. The refrigeration cycle apparatus of claim 1, wherein the partition is a horizontal partition, the casing has an air passage partition that laterally divides the casing, a space being defined between one wall of the casing and the air passage partition, and the space is vertically divided by the horizontal partition into the pipe connection chamber defined above the horizontal partition and the pipe draw-out chamber defined below the horizontal partition.

* * * * *